July 29, 1969  J. E. BURGER  3,457,857
CONTROL SYSTEM FOR MASTER PROCESSING AND DUPLICATING
Filed July 29, 1966  5 Sheets-Sheet 1
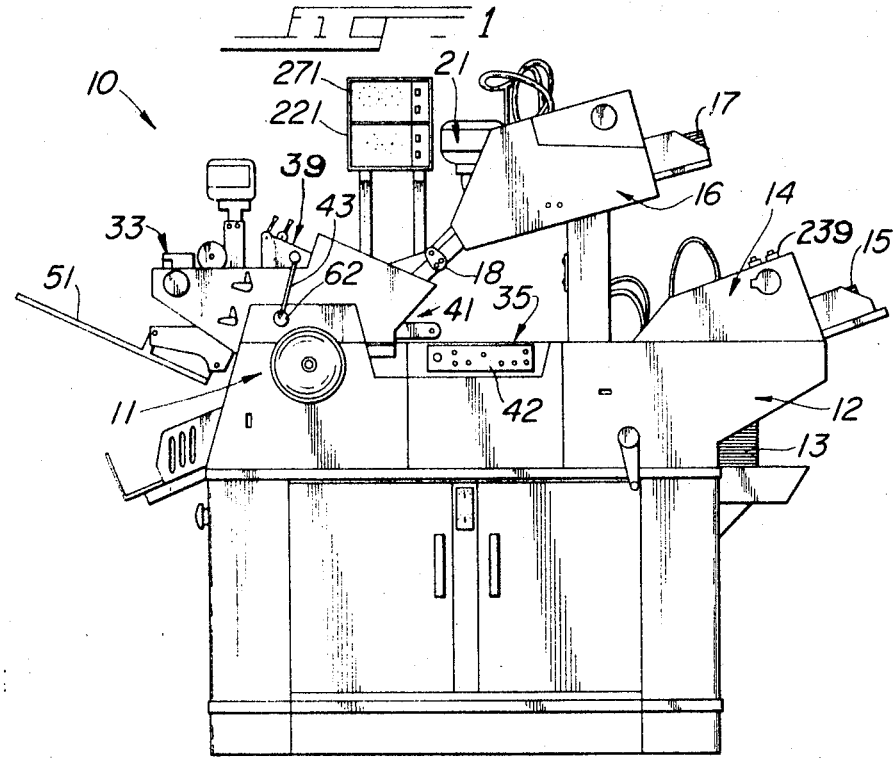
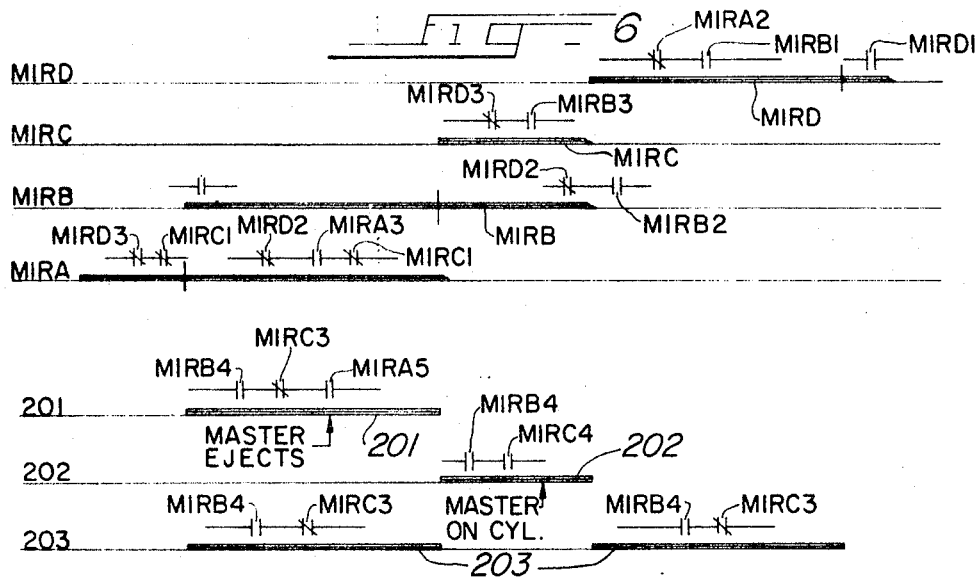
INVENTOR.
JACK E. BURGER
BY Ray S Pyle
ATTY.

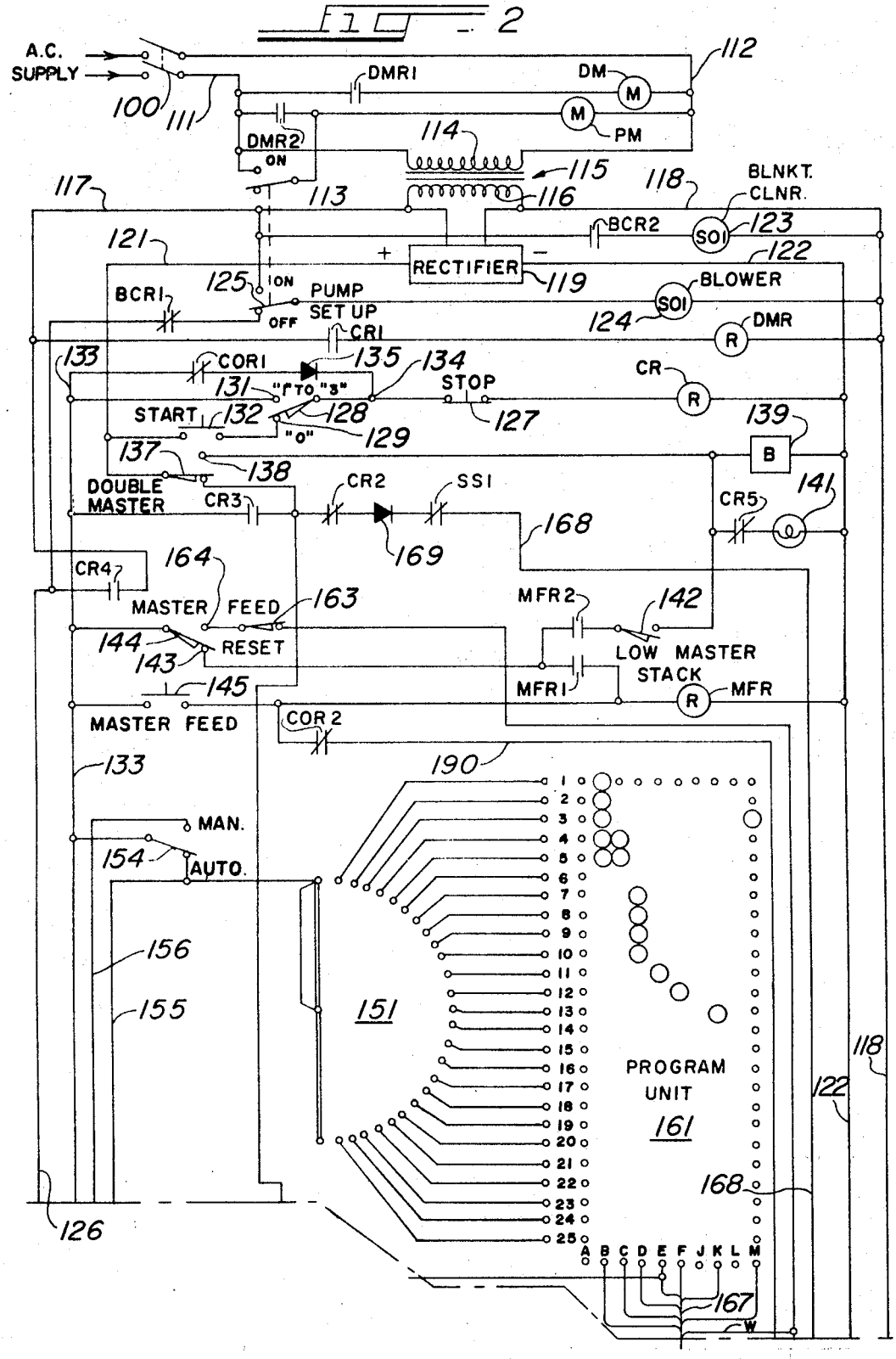

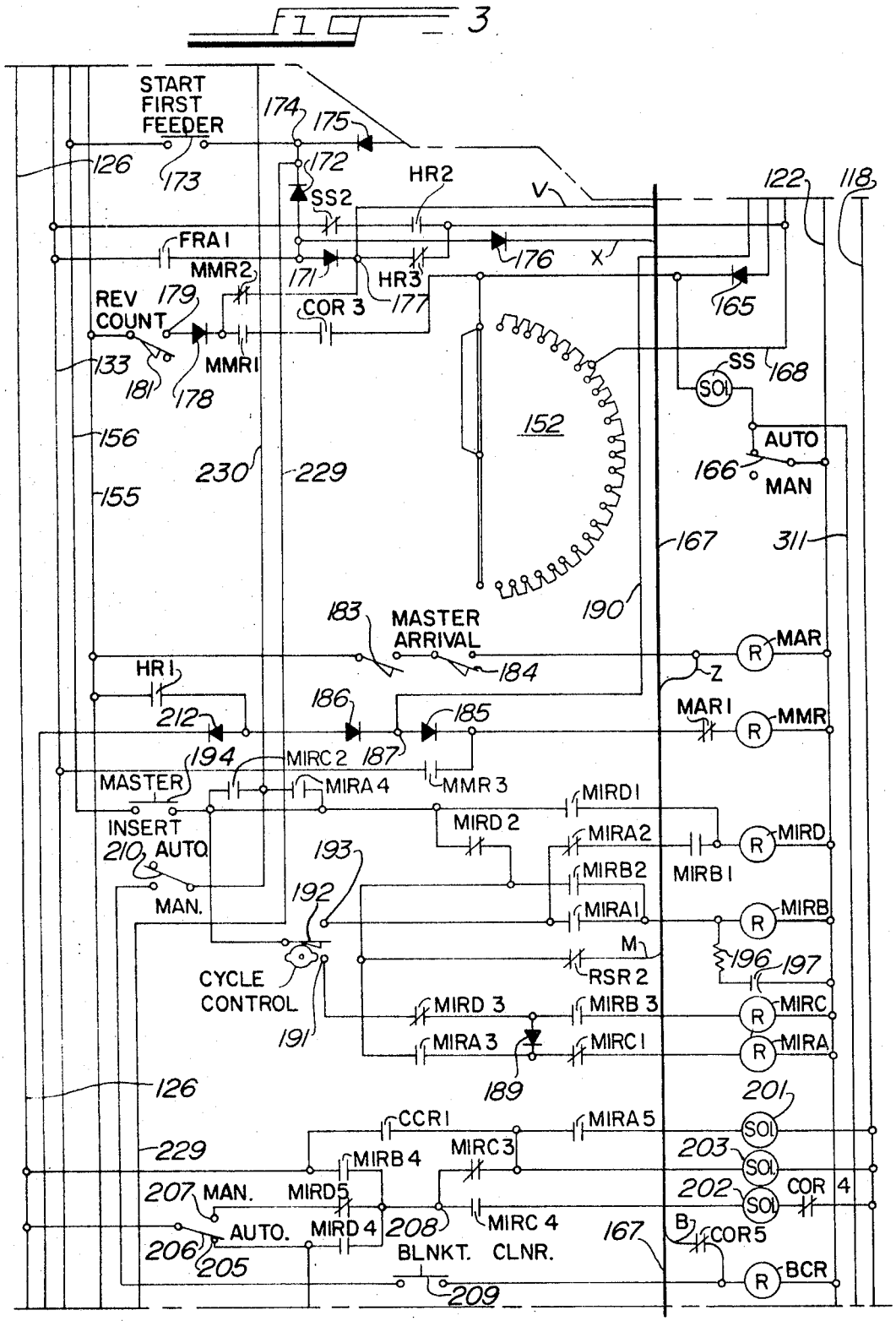

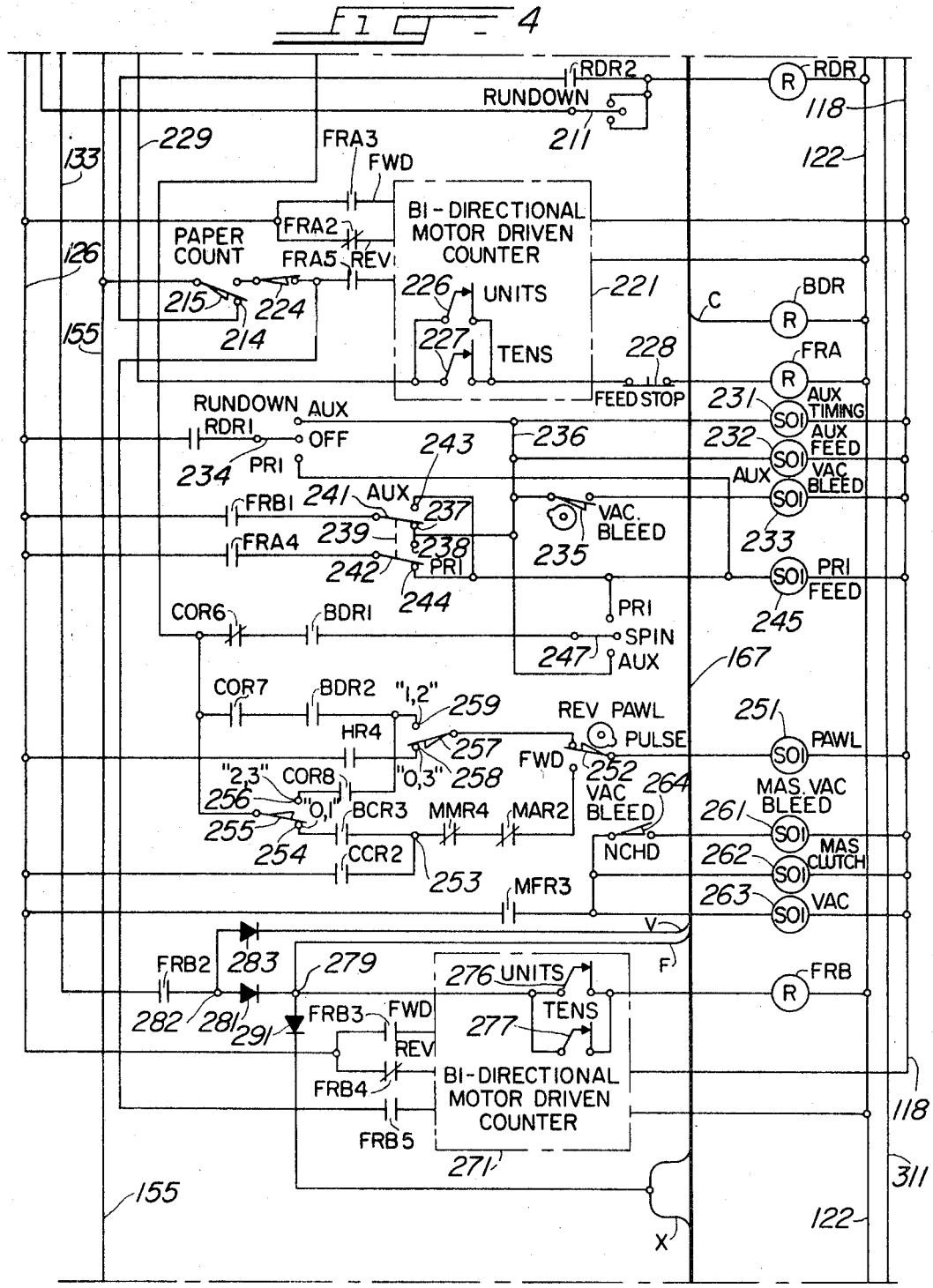

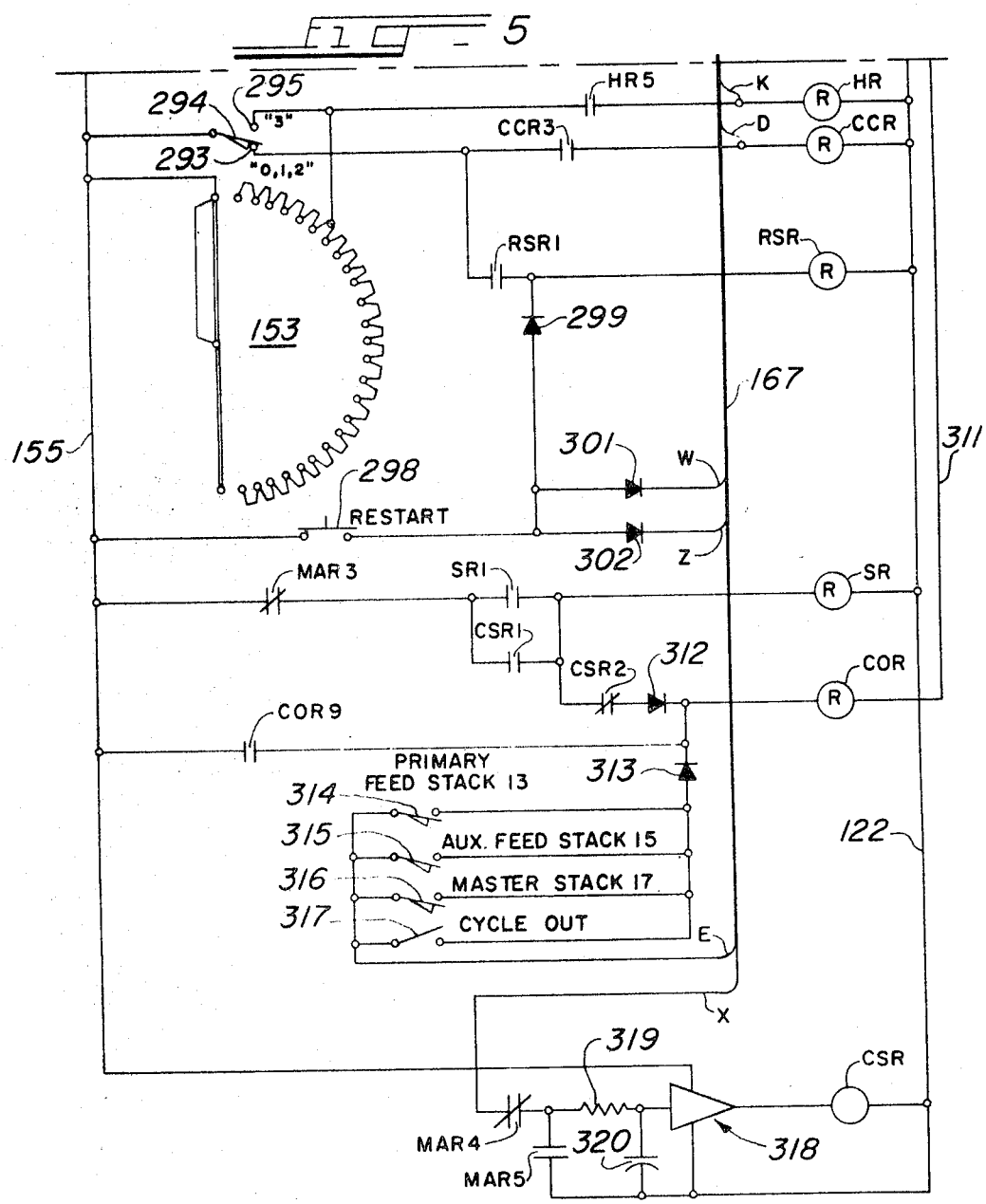

United States Patent Office 3,457,857
Patented July 29, 1969

3,457,857
CONTROL SYSTEM FOR MASTER PROCESSING
AND DUPLICATING
Jack E. Burger, Chagrin Falls, Ohio, assignor to Addressograph-Multigraph Corporation, Cleveland, Ohio, a corporation of Delaware
Filed July 29, 1966, Ser. No. 568,840
Int. Cl. B41f 33/16, 33/24
U.S. Cl. 101—144          20 Claims

ABSTRACT OF THE DISCLOSURE

A control system for a cyclically operable master processing and duplicating machine comprising a rotary master image cylinder, a document feeder for feeding master documents to the image cylinder, a plurality of individual preparation devices for operating upon the master documents, and a sheet feeder for feeding print receiving sheets to the master image cylinder. The control system comprises a multiple-contact stepping switch and a program unit having a plurality of output terminals individually selectively interconnectible with any of the stepping switch contacts, individual output terminals being electrically connected to the preparation devices and the sheet feeder. The control system further includes a sheet counter, means for advancing the stepping switch in synchronism with the image cylinder, automatic means for initiating and interrupting advancing operations of the stepping switch, and homing means for returning the stepping switch to a home position as a function of the sheet count.

BACKGROUND OF THE INVENTION

This invention relates to a new and improved control system for a cyclically operable rotary lithographic printing machine and more particularly to a control system in which all machine operations are under full system control requiring no attention by the machine operator.

A variety of different systems have been proposed for system control of lithographic printing and duplicating machines using replaceable masters, but most of these systems fall somewhat short of complete automation. One of the better prior art systems entailing substantial auomation of an offset printing machine is encompassed in Patent No. 3,056,346 to H. S. Gammeter and J. L. Bohnert, issued Oct. 2, 1962. In the system described in that patent, cleaning and drying of the blanket in the offset printing machine, imaging of the blanket, inking of the lithographic master, and application of repellent solution to the master are all controlled in accordance with the angular orientation of a single main control shaft. The patent also describes means for adjusting portions of the operational cycle for the machine, such as the time interval during which a cleaning solution is applied to the blanket, this control being effected by means of time delay relays having adjustable delay characteristics. The same machine is provided with a counter to determine the quantity of sheets to be printed by the machine in any given operation. But the system described in the patent leaves the application of a master starting-wetting solution to manual control on the part of the operator and requires the operator to insert a new master in the machine for each printing operation. Thus, the machine operator must devote substantial attention to the machine and is not free to concentrate on the organization of input and output material.

In one other prior art proposal, as set forth in Patent No. 2,916,988 to Cragg, most of the machine operations are controlled by a program unit comprising a stepping switch that is operated one step in each cycle of the machine. The stepping switch is connected to a plurailty of additional position switches which control inking, blanket imaging, and paper feeding in accordance with the stepping switch position. A control of this kind requires a relatively large stepping switch, particularly where any substantial quantity of sheets are to be printed in a given printing operation. Moreover, like other prior art systems, system automation is not as complete as might be desired to permit the machine operator to devote substantially full time to supplying the machine with masters and with paper, in proper organized manner, and to maintain the machine in continuous operation.

One problem presented with respect to fully automated control of a lithographic master printing machine pertains to the necessity for shutting down the machine when the operator must leave the machine or when some operational condition arises which does not necessarily demand immediate shutdown of the machine, but requires shutdown in the near future. For example, when lunch time arrives for the operator, with many previously known systems the operator must stop the machine at a precise point in its sequence of operations or else must later re-run whatever operation was in process at the time of shutdown. The same situation arises if the supply of paper or other print receiving sheets for the machine reaches a minimum level without having been observed by the machine operator so that an operation in which the machine is presently engaged could be finished but the next subsequent operation could not be finished. Under these circumstances, it is highly desirable to afford some means for interrupting operation of the machine by a control detector at a precise point in relation to the sequence of machine operations, but only following the completion of a full printing operation. This allows shutdown without requiring the operator to actuate a switch or take other positive action at some precisely defined point in the operational sequence. It is equally desirable to afford a manually controlled means for achieving the same result.

Moreover, in any machine of this kind, where automatic control is provided, it is highly desirable to afford some means for varying the length of some portions of the operating sequence, such as the blanket cleaning and blanket imaging functions, on the basis of a given number of machine cycles rather than as a straight timing function. In machines that are used for specializing printing operations requiring printing upon paper or other sheets having different characteristics, it is also quite desirable to provide for feeding of sheets to the printing head of the machine from two different supply sources with independent control of the quantities of sheets from the two sources.

It is a principal object of the present invention, therefore, to provide a new and improved control system for a cyclically operable lithographic master printing machine that permits complete automation of the machine without restricting the machine to any given number of sheets printed or to any specific sequence of operations, allowing full flexibility in both respects.

A more specific object of the invention is to afford a control system for a cyclically operable lithographic master printing machine that enables the operator to establish, in advance, a sequential program for control of the feeding of masters to the master cylinder of the machine, ejection and insertion of masters on the master cylinder, application of ink and repellent solution to the master, cleaning and drying of the blanket cylinder, and feeding of print-receiving sheets from either one of two sources, interchangeably, to the blanket cylinder of the machine. A specific object of the invention is to afford such control without requiring attention from the operator, once the machine is started, other than supplying additional masters and additional print-receiving sheets to the machine.

A particular object of the invention is to afford, in a control system for a cyclically operable lithographic master printing machine that includes two sheet feeders, a means for supplying a limited number of run-down sheets to the printing machine from either sheet feeder, after each printing run. The selection of the sheet feeder for run-down purposes is under the control of the operator. A related object of the invention is to provide a similar system for independent supply of one or more sheets to the printing head of the machine for blanket drying purposes, from either sheet feeder as selected by the operator.

Another object of the invention is to provide, in a control systm for a cyclically operable lithographic master printing machine, a cycle-out control which, when actuated, is effective to interrupt machine operation at a predetermined point in a sequential operational program following the completion of a printing run from a given master and before a new master is supplied to the master cylinder of the machine. A specific object of the invention is to provide for cycle-out operation whenever the last available master has been fed to the machine, whenever the supply of print-receiving sheets reaches a predetermined minimum level, or whenever there is a failure of feed of a new master to the machine.

An additional object of the invention is to provide for cycle-out control of machine interruption whenever desired by the machine operator.

A particular feature of the control system of the present invention is the provision of a program unit that establishes the basic sequential program for machine operations and that is used in combination with a conventional counter that counts the sheets imprinted by the machine separately from the operations of the program unit, the sequence of program unit operations being interrupted whenever printing is actually taking place and the counter is in operation. This feature of the invention is a particular value in achieving the general objective of full flexibility in machine operations without requiring undue complexity and cost in the construction of the program unit itself, by separating the sheet counting function from the program unit.

A specific object of the invention is to afford an effective and efficient means for shutting down a cyclically operable printing machine having a fully automated control system in the event of feeding of more than one master to the master cylinder of the machine.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention. The invention is directed to the type of offset machine which uses replaceable paper masters, and therefore reference hereinafter to offset printing or machines will be understood to be of this type.

DESCRIPTION OF THE INVENTION

FIGURE 1 is an elevation view of a rotary offset printing machine incorporating a control system constructed in accordance with one embodiment of the invention.

FIGURES 2, 3, 4 and 5 are sequential electrical schematic diagrams of the control system of the invention which, when arranged in vertical alignment and in numerical order, afford a complete schematic diagram of the control system.

FIGURE 6 is a timing chart illustrating the sequence of operations for the master ejection and insertion devices of the machine.

A general understanding of the construction and operation of a cyclically operable printing machine incorporating an automatic control system constructed in accordance with the present invention may be obtained by reference to FIGURE 1, which illustrates a printing machine 10 constructed in accordance with a preferred embodiment of the invention. As shown therein, the printing machine 10 is an offset printing machine or duplicating machine which in most respects is conventional in its mechanical construction. Thus, the printing machine 10 comprises a printing head 11 which includes the usual rotatable master cylinder for mounting a lithographic master within the head, a blanket cylinder, synchronized with the the master cylinder, for receiving an ink impression from the master cylinder, and a form cylinder, together with appropriate mechanism for moving the master cylinder into and out of contact with the blanket cylinder. The operating cylinders of printing head 11 have not been illustrated since these may all be of essentially conventional construction.

Printing head 11 further includes an inking mechanism 33 for applying ink to a lithographic master mounted upon the master cylinder of the printing head. In the course of a printing operation, ink is applied to the master, transferred by contact to the blanket cylinder, and imprinted upon a sheet of paper or the like passed between the blanket and form cylinders of printing head 11. Because the basic construction for the printing head is well known in the art, details of its construction are not shown in the drawings.

At the right-hand side of the printing machine 10, as shown in FIGURE 1, there is a primary paper feeder 12. Preferably, the paper feeder 12 is of the vacuum type and is utilized to feed individual sheets of paper or the like from a stack 13 across a conveyor table, generally indicated by reference numeral 35, to the printing head 11. Paper feeder 12 is substantially similar to that described in Patent No. 2,293,046 to Curtis and may include an apparatus for elevating the paper stack 13, as sheets are fed therefrom, of the kind described in Patent No. 2,358,560 to Curtis. Conveyor table 35 is of conventional construction and includes suitable jogging or other aligning devices to assure acurate alignment of the sheets of paper as they enter the printing head 11 between the blanket cylinder and the form cylinder of the printing head.

Paper feeder 12 is one of two paper feeders in the automated duplicating system 10. A second complete paper feeder 14 is located immediately above the primary feeder 12. This second paper feeder 14, referred to hereinafter as the auxiliary paper feeder, is essentially similar to the primary paper feeder 12. It, also, is utilized to feed paper or other print-receiving sheets from a second stack 15 across conveyor table 35 to the blanket cylinder in printing head 11. As in the case of the primary paper feeder 12, auxiliary paper feeder 14 is a solenoid-actuated vacuum feed device, the only important difference between the two paper feeders being the location of the stack of paper.

The automated printing or duplicating system 10 further includes a third feeder mechanism 16 that is essentially similar to paper feeders 12 and 14. The third feeder 16 of the machine, however, is employed to feed individual lithographic masters from a supply 17 down a conveyor 18 to the master cylinder of printing head 11. Again, a solenoid-actuated vacuum feeder mechanism is employed, like that of the two paper feeders; the operation of master feeder 16 may be somewhat slower than the two paper feeders 12 and 14 since there is no necessity for repetitive high speed operation of the master feeder, which is only required to supply a single master to the printing head of the machine for each complete printing operation.

The automated printing machine 10 includes a number of auxiliary operating devices, all subject to system control, which are employed directly in the printing process. Thus, master feeder 16 is provided with a wetting solution applicator 21 for applying an appropriate wetting solution to each lithographic master as the master is fed along the conveyor 18 to the printing head 11 of the machine. The wetting solution applicator 21 may comprise any device effective to apply a uniform coating of a wetting solution to each master as the master is fed to the conveyor 18; a particularly advantageous and effective construction for the wetting solution applicator is described and claimed in the co-pending application of Harry S. Gammeter, entitled "Master Processing and Duplicating," filed July 29, 1966, Ser. No. 568,837.

In most lithographic printing machines, it is necessary to apply a repellent soltuion to the master on the master cylinder during the course of the printing operation. For this purpose, printing head 11 is provided with a repellent solution applicator generally indicated by reference numeral 39. Repellent applicator 39 may be of generally conventional construction. A preferred form is that described in Patent No. 3,056,346 to Gammeter and Bohnert. The automated printing system 10 further includes a blanket cleaner which is hidden from view in FIGURE 1, but located in the general area indicated in numeral 41. Blanket cleaner 41 may be substantially similar to the blanket cleaner described and claimed in Patent Re. 24,739 to Mitchell and Janke. The blanket cleaner is utilized to apply a cleaning solution to the blanket cylinder, between individual printing operations, to provide for a change in the data being printed without requiring removal of the blanket cylinder or of the blanket from printing head 11. In addition, printing head 11 includes an appropriate blower (not shown) for blowing air against the blanket cylinder to dry the blanket cylinder and faciiltate rapid changing of the data being printed in the machine.

When conditioned for automated operation, printing machine 10 carries out a predetermined sequence of operations with no requirement for direct attention from the machine operator. The basic program for machine operations is established by the electrical control system described in detail hereinafter and by the angular position of a main control shaft 62. A manual control handle 43 is mounted upon the main control shaft 62 to provide for manual control of the printing machine when this is desired. The basic construction for the control devices actuated directly by the main control shaft 62 and the manner in which the control shaft is stepped between its variout operating positions are described in the aforementioned Patent No. 3,056,346 to Gammeter and Bohnert.

At the beginning of the automated printing operation, in machine 10, the machine operator must first make sure that there is an adequate supply of paper or other print-receiving sheets in each of the stacks 13 and 15. Ordinarily, the paper used for the two stacks will be different. For example, stack 15 may contain vellum-like paper or other expensive print-receiving sheets, whereas stack 13 may consist of ordinary bond paper or less expensive paper. The relationship between the stacks may be reversed and the higher quality sheets may be incorporated in stack 13, depending upon which of the stacks is to supply the major portion of the sheets to be printed. The operator also fills the master sheet feeder 16, placing a supply 17 in this feeder. A control switch 239, FIGURE 4, and on auxiliary feeder in FIGURE 1, is set by the operator to designate either primary sheet feeder 12 or auxiliary sheet feeder 14 as the first feeder to supply sheets to the printing head 11 of the machine. Once this has been established, the operator sets a first counter 221 to the number of sheets to be printed from the first feeder. A second counter 271 is set for the desired number of sheets to be printed from the second feeder. It should be recognized that either of the feeders 12 and 14 can be the first feeder and that the other becomes the second feeder.

The printing head 11 of the automated printing machine 10 is provided with a mechanism for ejecting a used master from the master cylinder of the machine and for inserting a new master, delivered from conveyor 18, onto the master cylinder. The master ejector emchanism is described and claimed in the application of Harry S. Gammeter filed concurrently herewith.

With the paper and master stacks 13, 15 and 17 filled by the machine operator, the automated printing machine 10 is ready for operation. For the first cycle of operation, the operator starts the machine by closing a start switch, as described in detail hereinafter, and also initiates feeding of the first master by master feeder 16 from supply 17 down conveyor 18. The first master is mechanically and positively inserted on the master cylinder of the printing head, having received an application of wetting solution from the applicator 21 before it moves onto conveyor 18. Once the master is positioned on the master cylinder, a repellent solution is applied to the master and the master is inked. These operations take place in response to control of the position of main control shaft 62 in the same manner as described in the aforementioned Patent No. 3,056,- 346.

The blanket cylinder of the machine is cleaned and dried and the blanket is imaged. With an ink image established on the blanket cylinder, one of the sheet feeders of the machine is started in operation. This can be either the primary sheet feeder 12 or the auxiliary feeder 14. A predetermined number of copies are printed on sheets fed from the first sheet feeder, depending upon the previously set number in counter 221. When this quantity of sheets has been imprinted, operation of the first sheet feeder is halted and the second sheet feeder is started up. Printing continues, on sheets fed from the second feeder, until a predetermined quantity, preset in counter 271 has been imprinted. Just after the end of the printing cycle, the machine control starts a new cycle of operation, feeding a second master from the master feeder 16 down conveyor 18. The old master is ejected to a magazine 51 and the new master is mounted on the master cylinder of the machine.

Operation of the machine under the control system continues indefinitely as long as the machine operator maintains a supply 17 of masters and a supply of paper in each of stacks 13 and 15. The operator is not required to perform any control steps with respect to the machine other than to supply paper and masters to the machine. It is the performance of this fully programmed control that is the principal object of the present invention.

THE ELECTRICAL CONTROL CIRCUIT

The electrical control system for the automated printing machine 10 is shown in FIGURES 2, 3, 4 and 5 which, when arranged vertically in that order, afford a comprehensive schematic diagram of the control circuit. As shown in FIGURE 2, the machine is connected to a conventional AC supply circuit by means of a double pole switch 100 connected to the AC lines 111 and 112. A main drive motor DM is connected across lines 111 and 112 with a pair of normally open drive motor relay contacts DMR1 interposed in series in the drive motor circuit. A pump motor PM is also connected across the AC lines 111 and 112 with a pair of normally open drive motor relay contacts DMR2 in series with the pump motor. A pump motor set-up switch 113 is connected in parallel with contacts DMR2 to afford a separate and independent energizing circuit for pump motor PM.

The primary winding 114 of a step-down transformer 115 is connected across the main AC lines 111 and 112. The terminals of the secondary winding 116 of transformer 115 are connected to two main low voltage AC buses 117 and 118. In addition, the secondary winding 116 of transformer 115 is connected to a conventional rectifier circuit 119 for energizing a positive main bus 121 and a negative main bus 122.

A blanket cleaner solenoid 123 is connected between the low voltage AC buses 117 and 118 in circuit with a pair of normally open blanket cleaner contacts BCR2. It should be recognized that there may be more than one blanket cleaner solenoid depending upon the construction of the blanket cleaner mechanism but that the electrical connections would be the same using plural solenoids. A blower solenoid 124 is provided, one terminal of the solenoid being connected to the AC bus 118. The other terminal of blower solenoid 124 is connected to the movable contact of a single-pole double-throw pump set-up switch 125 that is ganged with the switch 113. The "on" terminal of switch 125 is connected to the AC bus 117. The "off" terminal of switch 125 is connected through a pair of normally closed blanket cleaner relay contacts BCR1 to an operating AC bus 126, bus 126 being coupled to the main low voltage bus 117 through a pair of normally open control relay contacts CR4.

An operating coil DMR for the drive motor relay, located immediately below blower solenoid 124 in FIGURE 2, is connected between the low voltage AC bus 118 and bus 117 by a pair of normally open control relay contacts CRI.

A DC control relay CR is located below DMR in FIGURE 2. One terminal of the CR operating coil is connected directly to the DC bus 122. The other terminal is connected through a normally closed stop switch 127 to the movable contact of a control switch 128 that is actuated by the main control shaft 62 of the machine. Shaft 62 has four operating positions, designated "zero" through "three," as in aforesaid Patent No. 3,056,346. Switch 128 is shown in the position that it assumes for the "zero" position of the main control shaft, with the switch closed upon its fixed contact 129. For the "one," "two," and "three" positions of the main control shaft, switch 128 is closed upon its second fixed contact 131. Contact 129 is connectable, through a normally open start switch 132, to the DC bus 121. Switch contact 131, on the other hand, is connected to a "running" DC bus 133. A common terminal 134 between switches 127 and 128 is connected to the running DC bus 133 through a circuit that comprises, in series, a diode 135 and a pair of normally closed cycle-out relay contacts COR1.

In normal operation, bus 133 must be continuously energized. The energizing circuit begins at the main DC bus 121 and extends through a normally closed "double master" sensing switch 137 and through a pair of normally open control relay contacts CR3 to bus 133. Switch 137, which senses the thickness of the master being fed to the master cylinder of the duplicating system, is a single-pole double-throw switch. The normally open terminal 138 of this switch is connected to an audio alarm shown as a warning buzzer 139, buzzer 139 being returned to the negative DC bus 122. A warning lamp 141 is connected in parallel with buzzer 139, a pair of normally closed control relay contacts CR5 being connected in series with the warning lamp.

There is an alternate circuit for energizing buzzer 139 and lamp 141. This alternate circuit extends from the left-hand terminal of buzzer 139 to a normally open "low master" stack sensing switch 142. The master stack sensing switch 142, in turn, is connected through a pair of normally open master feed relay contacts MFR2 to one fixed contact 143 of a master feed reset switch 144. The movable contact of switch 144 is connected to DC bus 133. Terminal 143 of the master feed reset switch 144 is also connected to a set of normally open master feed relay contacts MFR1, in turn connected to the left-hand terminal of the operating coil MFR of the master feed relay. This same terminal of coil MFR is connected through a master feed switch 145 to the DC bus 133. The other terminal of the master feed relay coil MFR is returned to the DC bus 122.

One of the basic elements in the multi-cycle control system of the automated duplicating machine is a stepping switch. The first stage 151 of the stepping switch is shown in FIGURE 2 with two additional stages 152 and 153 of the same stepping switch being illustrated separately in FIGURES 3 and 5 respectively. The initial or "home" contact of the first stage 151 of the stepping switch is connected to the "auto" terminal of a manual-automatic switch 154. This terminal of switch 154 is also connected to an "automatic" DC bus 155, the movable contact of the switch being connected to the running DC bus 133. The "manual" terminal of switch 154 is connected to a "manual" DC bus 156.

The stepping switch employed in the circuit illustrated in the drawings has twenty-five active output terminals in addition to two diametrically opposed home terminals, the home terminals being connected to the switch arms. The twenty-five individual output terminals of stage 151 of the stepping switch are connected to twenty-five input terminals connected to individual conductors constituting the row conductors of a program unit 161. The program unit 161 illustrated is a conventional plugboard with horizontally extending row conductors and vertically extending column conductors interconnectable at each crossing point by means of a connector plug. Preferably, diode plug connections are employed to prevent feedback through the program unit.

The individual columns of program unit 161 relate to different functions for the automated printing machine. Thus, the B column of the program unit controls the blanket cleaning function of the duplicating system, the C column controls the blanket drying operation, and the D column controls the number of cycles of contact between the blanket and the master prior to the feeding of paper into the duplicating system. The E column of program unit 161 controls the first paper feeder to feed paper into the machine; this may be either the primary feeder 12 or the auxiliary feeder 14 (FIGURE 1), depending upon which feeder is selected as the "first" feeder by the operator. The F column of program unit 161 controls the number of cycles of operation for the second feeder. The K column of program unit 161 controls the homing of the stepping switch. Master feed is a by-product of this homing. The M column controls the master insertion function for the machine. It will be noted that there are spare columns in the program unit 161, columns A, J and L, which may be utilized in the control of a tandem duplicating system where machine 10 directly feeds a second printing head that is a part of the same duplicating system, as in a color printing process.

It is thus seen that the individual columns of program unit 161 are each relegated to the control of a given machine function. The individual rows 1–25 of the program unit, on the other hand, each identify a single machine cycle, since stepping switch 151–153 advances one step for each cycle of machine operation except during actual printing as described more fully hereinafter. One or more columns A–M are energized as desired, as determined by the crossover plugs used. Thus, in the illustrated set-up, rows 1 and 2 energize only column B as the first two lines are energized, but when the third line is energized, the columns B and M are both supplied with power.

Referring again to the master feed reset switch 144, it is seen that this switch is connected in series with a second master feed reset switch 163. The switch arrangement is such that the master feed reset switch 144 closes on its upper contact 164, upon feeding of a master to the master cylinder, immediately before switch 163 is opened. The second master feed reset switch 163 is connected through a diode 165, (FIGURE 3), to one terminal of a stepping switch solenoid SS that actuates the stepping switch 151–153. The other terminal of the stepping switch solenoid SS connected to the "auto" terminal of an automatic-manual switch 166, the movable contact of switch 166 being returned to the DC bus 122. The "manual" terminal of switch 166 is left open circuited so that the stepping switch will not be operated when the machine is under manual control. A further connection is provided from the second master feed reset switch 163 (FIGURE 2) to a conductor W that is incorporated in a cable 167; cable 167 also including individual electrical conductors from each of the column conductors in program unit 161.

In the second stage 152 of the stepping switch (FIGURE 3), all of the intermediate contacts are electrically connected to each other. An electrical connection to all of these contacts is afforded by a conductor 168 that extends from the second stage 152 of the stepping switch back into FIGURE 2 to a pair of normally closed internal spring contacts SS1 of the stepping switch. The internal spring contacts SS1 of the stepping switch are in turn connected through a diode 169 and through a pair of normally closed control relay contacts CR2 to the double master sensing switch 137 to afford a circuit connection to the positive bus 121.

As shown in FIGURE 3, conductor 168 branches off and is also connected back to the "running" DC bus 133 through a circuit comprising, in series, a pair of normally open homing relay contacts HR2 and a pair of normally closed internal spring contacts SS2 of the stepping switch. An alternate circuit from conductor 168 to the running DC bus 133 is provided through a pair of normally closed homing relay contacts HR3 and a diode 171, a pair of normally open feeder relay contacts FRA1 also being connected in this circuit. The feeder relay contacts FRA1 are also connected through a diode 172 to the right-hand terminal of a "start first feeder" switch 173, the other side of switch 173 being connected to the manual positive DC bus 156. The common terminal 174 between switch 173 and diode 172 is also connected to the E column of program unit 161 through a diode 175.

The feeder relay contacts FRA1 are also connected through a diode 176 to a conductor X in the cable 167. The common terminal 177 between diode 171 and homing relay contacts HR3 is connected to a conductor V in the cable. Terminal 177 is also connected through a pair of normally closed "master miss" relay contacts MMR2 and a diode 178 to one terminal 179 of a revolution count switch 181, the movable contact of switch 181 being connected to the "automatic" DC bus 155. The revolution count switch terminal 179 is also connected, through diode 178 and through a pair of normally open master miss relay contacts MMR1 and a pair of normally open cycle-out relay contacts COR3, to the zero or home terminal of stage 152 of the stepping switch. The home terminal of stepping switch stage 152 is also electrically connected to the stepping switch solenoid SS.

In the central portion of FIGURE 3, immediately below stepping switch stage 152, there are a pair of series connected master arrival switches 183 and 184. Switch 183 is a normally open switch that is connected to the "automatic" positive DC bus 155. Switch 184 is a normally open switch that is connected to one terminal of the operating coil MAR of a master arrival relay. The conveyor 18 may not present a master to the loading arms of the machine 10 in proper alignment, and if transmitted to the cylinder canted, will be run canted. Therefore, switches 183 and 184 are spaced laterally on a line which is exactly parallel to the cylinder surface. Both must be closed to permit the subsequent functions to follow. If a master is only slightly canted, then the conveyor 18 will usually be able to jostle the master until it does contact both switches. Otherwise, operator attention will be required.

An operating coil MMR for the master miss relay is located immediately below coil MAR in FIGURE 3. One terminal of coil MMR is connected directly to the negative DC bus 122. The other terminal of the master miss relay coil is connected through a pair of normally closed master arrival relay contacts MAR1 to an energizing circuit comprising, in series, two diodes 185 and 186 and a pair of normally open homing relay contacts HR1, the homing relay contacts being connected to the DC bus 155. An alternate energizing circuit for coil MMR is provided; this alternate circuit extends from the common terminal 187 of diodes 185 and 186 via a conductor 190, through a pair of normally closed cycle-out relay contacts COR2 (FIGURE 2) to the master feed switch 145 which, when closed, affords a connection to the operating DC bus 133. A holding circuit is provided for coil MMR through its own contacts MMR3, which are connected between the master arrival relay contacts MAR1 and the DC bus 133.

Control of master insertion on the cylinder of the machine is effected by four master insertion relays; the operating coils for these relays are the coils MIRA, MIRB, MIRC and MIRD, shown in a vertical column in the lower right corner of FIGURE 3, each of which has one terminal connected to the negative DC bus 122 (FIGURE 3). The operating coil MIRA for the first of the master insertion relays is further connected to an energizing circuit comprising, in series, a pair of normally closed contacts MIRC1 from the third master insertion relay, a diode 189, a pair of normally closed contacts MIRD3 in the fourth master insertion relay, and one terminal 191 of a cycle control switch 192. Cycle control switch 192 is constructed to provide for closing of its movable contact on terminal 191 for a duration of approximately 135° in rotation of the master cylinder in each machine cycle. The switch closes upon a second output terminal 193 for a duration of approximately 225° in each rotational cycle of the cylinder.

The movable contact of switch 192 is connected to one terminal of a master insertion switch 194. Switch 194 has a second contact which is connected to the manual DC bus 156. The movable contact of switch 192 is also conected through a pair of normally open relay contacts MIRC2 to a conductor 230. Conductor 230 extends back to the normally closed terminal of the "double master" sensing switch 137 (FIGURE 2) and thence to the main DC bus 121. A pair of normally open contacts MIRA4 are connected in parallel with the contacts MIRC2 between the movable contact of switch 192 and conductor 230.

The master insertion switch 194 is employed to actuate the master insertion relays only when the machine is under manual control by the operator. The initial energizing circuit for the first master insertion relay MIRA, under automatic control, is derived from column M of program unit 161 which is connected, through cable 167, to a pair of normally closed reset relay contacts RSR2 (FIGURE 3). Contacts RSR2 are, in turn, connected through a pair of normally closed contacts MIRD2 to the movable contact of cycle control switch 192. A holding circuit for coil MIRA is provided from contacts RSR2 through the normally open contacts MIRA3 and through contacts MIRC1 to the coil.

The energizing circuit for the second master insertion relay coil MIRB extends from the left-hand terminal of the coil through a pair of normally open contacts MIRA1 to terminal 193 of cycle control switch 192. A holding circuit connection is afforded from coil MIRB through its normally open contacts MIRB2 and through normally closed contacts RSR2 to the energizing line M. The holding circuit branches through contacts MIRD2 to contacts MIRA4 and MIRC2 and thence to conductor 230.

The third master insertion relay coil MIRC is provided with an energizing circuit that extends through the normally open relay contacts MIRB3 and through the normally closed contacts MIRD3 to terminal 191 of cycle control switch 192. The remaining master insertion relay coil MIRD has an energizing circuit that extends from the coil through a pair of normally open contacts MIRB1 and a pair of normally closed contacts MIRA2 to terminal 193 of cycle control switch 192. There is a holding circuit for this relay that comprises a pair of its own contacts MIRD1 that connect back to the contacts MIRC2 and MIRA4.

The energizing circuits for the master insertion relays are completed by a delay circuit for the second master insertion relay coil MIRB. This circuit comprises a resistor 196 and a capacitor 197 connected in series with each other from the left-hand terminal of coil MIRB to the negative DC bus 122.

Master ejection, in the automated duplicating system 10, is controlled by three solenoids 201, 202 and 203 that appear in the lower right-hand corner of FIGURE 3. Master ejection solenoid 201 has one terminal connected to the AC bus 118. The other terminal of the solenoid is connected to an energizing circuit comprising a pair of normally open master insertion relay contacts MIRA5 and a pair of normally open cylinder contact relay contacts CCR1 connected in series with each other, contacts CCR1 being connected to the AC bus 126.

The second master ejection solenoid 202 has one terminal connected to the AC bus 118 through a pair of normally closed cycle-out relay contacts COR4. The other terminal of solenoid 202 is connected to an energizing circuit comprising, in series, a pair of normally open master insertion relay contacts MIRC4 and a pair of normally open contacts MIRB4, contacts MIRB4 being returned to AC bus 126. An alternate energizing circuit is provided from contacts MIRC4 through a pair of normally open master insertion relay contacts MIRD4 to the "auto" terminal 205 of a manual-automatic switch 206, the movable contact of switch 206 being connected to AC bus 126. Yet another connection is made from the common terminal 208 of contacts MIRC4, MIRD4 and MIRB4 through a pair of normally closed master insertion relay contacts MIRD5 to the "manual" terminal 207 of switch 206.

The third master ejection solenoid 203 has one terminal connected directly to AC bus 118. The other terminal of solenoid 203 is connected to an energizing circuit that extends through the cylinder contact relay contacts CCR1 to the other AC bus 126. Another energizing circuit is provided through a pair of normally closed master insertion relay contacts MIRC3 to the terminal 208.

The operating coil BCR for a blanket cleaner relay is shown in FIGURE 3 immediately below the master ejection solenoid 202. One terminal of this coil is connected directly to the DC bus 122. For automatic operation, the blanket cleaner relay is energized through a circuit comprising a pair of normally closed cycle-out relay contacts COR5 and conductor B, which extends through cable 167 to the B column of program unit 161. For manual operation, the blanket cleaner relay can be energized through a blanket cleaner switch 209. Switch 209 is connected to the "manual" terminal of an automatic-manual switch 210, the movable contact of switch 210 being connected to conductor 230. The "auto" terminal of switch 210 is left open-circuited so that accidental closing of the blanket cleaner switch 209 during an automatic control cycle is not effective to energize the blanket cleaner relay coil BCR.

Blanket rundown operations in the automated duplicating system are controlled by a run down relay; the operating coil RDR for this relay appears in the upper right hand corner of FIGURE 4. One terminal of coil RDR is connected directly to the negative DC bus 122. The other terminal of the coil is connected to two terminals of a three-terminal run down switch 211. Switch 211 is connected through a diode 212 (FIGURE 3) and through the normally open homing relay contacts HR1 to the "automatic" DC bus 155. A holding circuit for coil RDR is provided through its normally open contacts RDR2, which connect the left-hand terminal of the coil to one terminal 214 of a paper count switch 215, the movable contact of switch 215 being connected to the "automatic" DC bus 155.

The blanket drying operation in the machine is controlled by a blanket dry relay, the operating coil BDR for this relay being illustrated in FIGURE 4 below the run down relay coil RDR. Coil BDR has one terminal connected directly to the low voltage DC bus 122. The other terminal of coil BDR is connected to line C in cable 167, which extends back to the C column of program unit 161 (FIGURE 2).

Paper feed operations in the automated printing machine (FIGURE 1) are controlled, in part, by the bi-directional motor driven counter 221 illustrated in FIGURES 1 and 4. Counter 221 (FIGURE 4) is of conventional construction and includes a bi-directional motor that can be driven in one direction when energized through a "forward" input and in the reverse direction when energized through a "reverse" input. Energization of the counter motor for forward counting is effected by a circuit connected to the "forward" input and including a pair of normally open feeder relay contacts FRA3. The "reverse" energizing circuit includes a pair of normally closed feeder relay contacts FRA2. Both of the contact pairs FRA2 and FRA3 are connected to the "running" AC bus 126.

Movement of paper through the duplicating machine is signaled to counter 221 by two paper count switches, the normally open switch 215 and a normally closed switch 224. The switches 215 and 224 are connected in a series with each other between the "automatic" DC bus 155 and the counter, a pair of normally open feeder relay contacts FRA4 being connected in series in this circuit. Appropriate return connections are provided from the bi-directional motor driven counter 221 to the AC bus 118 and to the DC bus 122.

Inasmuch as the counter 221 is a conventional commercially available device, the internal driving and operating circuits for the counter have not been illustrated. The counter 221 can be set for any desired number of sheets, and signals completion of a preset count by the opening of internal contacts within the counter. The counter is driven by a motor operating on AC power, but supplies DC power signals, and therefore must be supplied with both types of power. In FIGURE 4, two sets of parallel-connected internal contacts, the "units" contacts 226 and "tens" contacts 227 are illustrated. It should be understood, however, that if the duplicating machine is to be used for runs entailing more than one hundred sheets, the counter may be provided with a set of "hundreds" contacts as well, with all contacts connected in parallel.

Counter 221 controls the energization of a first feeder relay, the operating coil for this relay being the coil FRA. One terminal of coil FRA is connected directly to DC bus 122. The other terminal of the coil is connected through a feed stop switch 228 to the internal counter contacts 226 and 227. Contacts 226 and 227, in turn, are connected to a conductor 229 that extends to the terminal 174 shown at the top of FIGURE 3, that is connected to the switch 173 for starting the "first" feeder of the system on manual control. Connection to terminal 174 also provides for energization of coil FRA through the automatic feeder control circuits illustrated in the upper left-hand corner of FIGURE 3, the operation being described in detail hereinafter.

Immediately below the motor driven counter 221, in FIGURE 4, are the solenoids that control operation of the paper feeders of the system. These comprise a timing solenoid 231, an auxiliary feed solenoid 232, and a vacuum bleed solenoid 233. Timing solenoid 231 has one terminal connected to the AC bus 118. The other terminal of the solenoid is connected to the "auxiliary" terminal of a single-pole double-throw rundown switch 234 that is ganged with switch 211. The movable contact of rundown switch 234 is connected through a pair of normally open rundown relay contacts RDR1 to AC bus 126. The auxiliary feed solenoid 232 is connected in parallel with solenoid 231. The vacuum bleed solenoid 233 is connected in parallel with solenoids 231 and 232, except that a cam-actuated vacuum bleed switch 235 is connected in series in the operating circuit of solenoid 233.

Another energizing circuit is provided for solenoids 231–233, independent of the circuit through run down switch 234. Thus, the conductor 236 that is connected directly to solenoids 231 and 232, and that is connected to solenoid 233 through switch 235, is also connected to two terminals 237 and 238 of a double-pole double-throw auxiliary-primary switch 239. The one movable contact 241 of switch 239 that is engageable with "primary" terminal 237 is returned to AC bus 126 through a circuit that includes, in series, a pair of normally open auxiliary feeder relay contacts FRB1. The second movable contact 242 of the switch, which is engageable with "auxiliary" terminal 238, is connected to the AC bus through a pair of normally open contacts FRA4 from the paper feeder control relay FRZ. The two remaining terminals of switch 239 are the "auxiliary" contact 243 and the "primary" contact 244. Terminals 243 and 244 are connected to each other and to one terminal of a primary feed solenoid 245. An alternate energizing circuit for primary feed solenoid 245 is provided by a connection from the solenoid to the "primary" terminal of rundown switch 234. The remaining terminal of solenoid 245 is connected directly to AC bus 118.

The auxiliary and primary feed solenoids 232 and 245 are each provided with yet another energizing circuit through a primary-auxiliary selector switch 247. Thus, solenoid 245 is connected to the "primary" terminal of the single-pole double-throw selector switch 247. Auxiliary feed solenoid 232 and timing solenoid 231 are connected to the "auxiliary" terminal of the selector switch. The movable contact of the switch 247 is connected to a circuit that includes, in series, a pair of normally open blanket dry relay contacts BDR1, a pair of normally closed cycle-out relay contacts COR6, and the "automatic" terminal 205 of the manual-automatic switch 206 (FIGURE 3) which provides a connection to the AC bus 126.

Immediately below primary feed solenoid 245, in FIGURE 4, is the pawl solenoid 251 that controls the pawl mechanism that advances and retracts the main control shaft 62 of the machine between its four different operating positions. The pawl mechanism itself is described in detail in the aforementioned Patent No. 3,056,346 to Gammeter et al., and hence has not been illustrated in the drawings. The pawl solenoid 251 has one terminal connected to the AC bus 118. The other terminal of the solenoid is connected to the movable contact of a pawl pulse switch 252. The "forward" terminal of the pawl pulse switch 252 is connected, in one circuit, through the series combination of a pair of normally closed master arrival relay contacts MAR2, a pair of normally closed master miss relay contacts MMR4 and a pair of normally open cylinder contact relay contacts CCR2 to AC bus 126. In this circuit, the intermediate terminal 253 between relay contacts CCR2 and MMR3 is connected to a pair of normally open blanket cleaner relay contacts BCR3. Contacts BCR3 are connected to one terminal 254 of a control switch 255; the movable contact of switch 255 is closed upon terminal 254 for both the "zero" and "one" positions of the master control shaft and is closed upon an alternate terminal 256 for the other positions of that shaft. The movable contact of switch 255 is connected to the AC bus 126 through terminal 205 of the manual-automatic switch 206( FIGURE 3).

The reverse terminal of pawl pulse switch 252 (FIGURE 4) is connected to the movable contact of a control switch 257. Switch 257 is a single-pole double-throw switch, actuated by the main control shaft 62 of the machine, having two poles 258 and 259. Switch 257 is closed on its terminal 259 for the "one" and "two" positions of the master control shaft. This same switch is closed upon its pole 258 for the "zero" and "three" positions of the master control shaft.

Pole 258 of control switch 257 is connected through a pair of normally open homing relay contacts HR4 to the AC bus 126. Pole 259 is connected through a pair of normally open cycle-out relay contacts COR8 to terminal 256 of control switch 255. Pole 259 is also connected through the series combination of a pair of normally open blanket dry relay contacts BDR2 and a pair of normally open cycle-out relay contacts COR7 to the "auto" terminal 205 of switch 206 (FIGURE 3) and thence to bus 126.

Three solenoids are employed for actuation and operation of the master feeder 16 of the machine (FIGURE 1). These comprise a master vacuum bleed solenoid 261, a master clutch solenoid 262 and a vacuum solenoid 263 (FIGURE 4). One terminal of each of the solenoids 261–263 is connected to the AC bus 118. Each of solenoids 262 and 263 is connected to the AC bus 126 through a circuit that includes, in series, a pair of normally open master-feed relay contacts MFR3. A similar circuit is provided for solenoid 261 except that a normally closed held open vacuum bleed switch 264 is provided in series with this circuit.

A second feeder relay having an operating coil FRB, and the second counter 271 which is bi-directional motor driven, are included in FIGURE 4. Counter 271 is essentially identical to counter 221, described above, and includes an internal set of "units" contacts 276 and "tens" contacts 277 connected in parallel with each other. One terminal of the contacts 276, 277 is connected to the second feeder relay coil FRB, which is in turn connected to the DC bus 122. The other terminal of counter contacts 276, 277 is connected to the conductor F of cable 167 that originates in column F of program unit 161 (FIGURE 2).

An input conductor 279 to the counter contacts 276 and 277 is also connected, through the series combination of a diode 281 and a pair of normally open second feeder relay contacts FRB2 to the running DC bus 133. An intermediate terminal 282 between diode 281 and contacts FRB2 is connected through a diode 283 to the conductor V in cable 167 which originates with the diode 171 (terminal 177, FIGURE 3).

It will be recognized that counter 271, like counter 221, requires both an AC input for the motor of the counter and a DC signal input to indicate to the counter the passage of paper into the printing head of the duplicating machine. The paper count input signals are supplied to the counter through a circuit that includes a pair of normally open contacts FRB5 of the second feeder relay, contacts FRB5 being connected back via bus 155 to the paper count switches 215 and 224 just as in the case of the counter 221. Power is supplied to 155 via bus 133 and main bus 121.

The motor connections to the counter 271 are provided by a "forward" terminal connected through a pair of normally open second feeder relay contacts FRB3 to the AC bus 126 and a "reverse" terminal connected to the AC bus 126 through a pair of normally closed contacts FRB4. A further connection is provided from the input terminal 279 of counter 271 through a diode 291 to the conductor X in cable 167. Appropriate return connections are provided from the counter to the AC bus 118 and the DC bus 122.

The homing function for the stepping switch function of stages 151, 152 and 153 in the control system, is controlled by the column K in program unit 161 which, as noted above, is electrically connected to conductor K in cable 167. As shown in FIGURE 5, conductor K is connected to one terminal of a homing relay operating coil HR, the other terminal of coil HR being connected to the DC bus 122. A holding circuit for the homing relay is provided through relay contacts HR5, which are connected to all of the intermediate contacts of the third stepping switch stage 153, the "home" contact of this stage of the stepping switch being connected to the "auto" DC bus 155.

The cylinder contact relay coil CCR is provided with an energizing circuit from conductor D in cable 167, connected to column D of the program unit 161. Coil CCR is also connected to DC bus 122. A holding circuit for the cylinder contact relay is provided through the normally open relay contacts CCR3 and through one terminal 293 of a control switch 294, the movable contact of this switch being connected to the "automatic" DC bus 155. Control switch 294 is closed on terminal 293 for the "zero" through "two" positions of the main control shaft 62 and is closed upon another terminal 295 of the switch only in the "three" position of the shaft. Terminal 295 is connected to the HR5 contacts.

Switch 294 also controls, in part, the energization of the operating coil RSR for the restart relay of the system. Thus, one terminal of coil RSR is connected to the DC bus 122 and the other terminal of the coil is connected through a pair of normally open holding contacts RSR1 to terminal 293 of the control switch. The main energizing circuit for coil RSR extends from bus 155 through a restart switch 298 and a diode 299 to the relay coil. Restart switch 298 also provides for energization of devices connected to the conductors W and Z in cable 167, being connected to the conductor W through a diode 301 and to the conductor Z through a diode 302. It will be recalled that the conductor W connects back to diode 165 in the input to the stepping switch solenoid SS and that the conductor Z affords an energizing circuit for the master arrival relay coil MAR (FIGURE 3).

The cycle-out relay for the system includes the coil COR in FIGURE 5. One terminal of coil COR is connected to the negative DC supply by means of conductor 311 that extends back to FIGURE 3 and is connected to the "auto" terminal of switch 166. There are several energizing circuits for coil COR. One of these extends from the coil through a diode 312, a pair of normally closed cylinder stop relay contacts CSR2, a pair of normally open slave relay contacts SR1, and a pair of normally closed master arrival relay contacts MAR3 to the "automatic" DC bus 155. A pair of normally open cylinder stop relay contacts CSR1 are connected in parallel with the slave relay contacts SR1. Part of this circuit is also used to energize the slave relay coil SR. Thus, one terminal of coil SR is connected to the DC bus 122 and the other terminal is connected to the slave relay contacts SR1 and the cylinder stop relay contacts SCR1.

A series of sensing switches are connected in parallel with each other, affording a plurality of alternate energizing circuits for coil COR. The first of these circuits extends from coil COR through a diode 313 and through a primary feeder stack sensing switch 314 to the conductor E in cable 167. Conductor E originates with the E column in program unit 161 (FIGURE 2). An auxiliary feeder stack sensing switch 315 (FIGURE 5) is connected in parallel with the primary feeder stack switch 314. A master stack sensing switch 316 is connected in parallel with switches 314 and 315. A manually operable cycle-out control switch 317 is also connected in parallel with these switches. Thus, any of the switches 314–317, when closed, is effective to energize the cycle out relay coil COR whenever there is a positive voltage on the line E from the program unit. The cycle out relay is provided with a holding circuit extending from coil COR through its normally open contacts COR9 to DC bus 155.

The cylinder stop relay coil CSR is located in the lower righthand corner of FIGURE 5. One terminal of coil CSR is connected directly to the DC bus 122. The other terminal is connected through a delay device 318 and through a pair of normally closed master arrival relay contacts MAR4 to the X conductor in cable 167. The X conductor of cable 167 originates at diode 176 in FIGURE 3 and is also connected to diode 291 in the operating circuit for counter 271.

Delay device 318 is, essentially, a simple DC amplifier having operating connections to the two buses 122 and 155, the input for the amplifier being through contacts MAR4, with a resistor 319 connected in series in the amplifier input. A relatively large capacitor 320 is connected from the input terminal of the amplifier to bus 122. A discharge circuit for capacitor 320 is provided through a pair of normally open master arrival relay contacts MAR5 that are returned to bus 122.

CONTROL CIRCUIT OPERATIONS

In placing the control system of the present invention in operation, the AC supply switch 100 is closed, completing an operating circuit to the primary winding of transformer 115. This supplies low voltage AC power on the AC buses 117 and 118. Furthermore, it completes a power input to rectifier 119 and provides for low voltage (24-volt) DC on buses 121 and 122.

It may be desirable to operate the vacuum pump motor PM for a short period of time prior to initiation of duplicating operations for set-up purposes, as the machine is turned over by hand, to check the feeding action of a vacuum feed system. This is accomplished by actuation of the ganged manual pump set-up switches 113 and 125 to the "on" position. The manual closing of switch 113 completes an energizing circuit to vacuum pump motor PM, placing the pump in operation. The closing of switch 125 completes an operating circuit for blower solenoid 124, initiating operation of the blower in the duplicating machine. After a short interval of time, switches 113 and 125 are returned manually to the "off" position, interrupting operation of the pump motor and of the blower, so that the machine is now ready for a printing operation.

Initially, normal operation of the printing system with the electrical control system conditioned for automatic control will be considered. It may be assumed that all of the automatic-manual switches are in the "automatic" position. It may further be assumed that an adequate supply of paper is available in each of the stacks for the primary paper feeder 12 and the auriliary paper feeder 14, and that a substantial supply of masters is available in the master feeder 16. Furthermore, it may be assumed that the program unit 161 is set up for the program illustrated in FIGURE 2 and that the primary feeder 12 has been selected as the "first" feeder.

To start the system in operation, the operator closes the start switch 132. The control shaft 62 of the machine is in its original or "zero" position, so that closing of switch 132 energies the control relay coil CR through the circuit comprising switch 132, control switch 128, and the normally closed stop switch 127. The control relay has five sets of contacts CR1–CR5. Energization of coil CR actuates the control relay and closes contacts CR1, completing an operating circuit for the drive motor relay coil DMR. The closing of contacts CR3 energizes the "running" DC bus 133 through a circuit that begins with the main DC bus 121 and extends through normally closed "double master" sensing switch 137 and contacts CR3.

Actuation of the control relay also opens contacts CR2 so that, at the present time, the positive DC voltage is not supplied to conductor 168 that is connected to the contacts of the second stage 152 of the selector switch. Contacts CR4 close, energizing the "running" AC bus 126. Finally, the opening of control relay contacts CR5 prevents energization of the warning lamp 141.

As noted above, the closing of contacts CR1 of the control relay immediately energizes the drive motor relay coil DMR. As a consequence, contacts DMR1 close, energizing the drive motor DM for the duplicating system. Moreover, contacts DMR2 close, energizing the pump motor PM.

Control relay coil CR remains energized while the duplicating system is in normal operation. The holding circuit for coil CR, as initially established, extends from the running DC bus 133, energized through contacts CR3, and through the normally closed cycle-out relay contacts COR1 and diode 135. Moreover, there is an alternate holding circuit for coil CR. When the master control shaft of the duplicating machine advances from its "zero"

position to its "one" position, control switch 128 is closed on its contact 131. This control switch remains closed as long as the control shaft 62 of the machine does not return to its initial or "zero" position. Thus, as long as stop switch 127 is not actuated and as long as the machine remains in any of the "one" through "three" operating conditions for the main control shaft, control relay coil CR is held in its energized condition. Furthermore, it should be noted that the drive motor relay coil DMR remains energized, through contact CR1, as long as the main control relay is actuated. During normal machine operation, under the control of the electrical system shown in FIGURES 2–5, with no voluntary shut-down of the duplicating system and no failures (such as exhaustion of paper supply or master supply, feeding of two masters, etc.) the main control shaft of the machine moves only between its "two" and its "three" positions, maintaining both drive motor relay coil DMR and control relay coil CR energized.

One further action on the part of the operator is required with respect to the first cycle of operation when the system is first placed in use. The operator closes master feed switch 145 manually for the first printing operation, although this is not necessary on subsequent operations. Upon closing the master feed switch 145, the master feed relay coil MFR is energized.

Energization of coil MFR, actuating the master feed relay with its three sets of contacts, closes the master feed realy contacts MFR1 and MFR2. Closing of contacts MFR1 establishes a holding circuit for coil MFR through master feed reset switch 144, which at the beginning of machine operation is closed upon its terminal 143. Closing of contacts MFR2 energizes buzzer 139 if switch 142 is closed, showing a shortage of masters at the start of a cycle of printing operations. It should be noted that warning lamp 141 is not energized because contacts CR5 are open. Energization of coil MFR also closes contacts MFR3 (FIGURE 4) and energizes master clutch and vacuum solenoids 262 and 263. The vacuum solenoid causes a paper feeder device to pick up one master from a stack and feed it to drive feed rollers, which are controlled by master clutch solenoid 262. This causes the master feeder mechanism 16 to feed a first master into the conveyor 18 leading to the master cylinder of the duplicating machine (see FIGURE 1).

The closing of master feed switch 145 by the machine operator also energizes the coil MMR, through conductor 190. Coil MMR serves in a function to detect the fact of a master not feeding, and therefore is referred to as a master-miss relay. Starting in FIGURE 2 at master feed switch 145, it may be seen that the energizing circuit for coil MMR extends from bus 133 through switch 145 and through the normally closed cycle-out relay contacts COR2. From contacts COR2 the energizing circuit extends into FIGURE 3, through diode 185 and master arrival relay contacts MAR1 to coil MMR. Accordingly, closing of master feed switch 145 actuates the master-miss relay.

Upon actuation of the master-miss relay, contacts MMR1, located immediately to the left of stage 152 of the selector switch in FIGURE 3, close. However, this does not complete a new operating circuit because the contacts COR3 in series with contacts MMR1 are open. Moreover, contacts MMR2, located immediately above contacts MMR1, are opened upon actuation of the relay, preventing energization of the operating circuits connected to terminal 177. Contacts MMR3, located in FIGURE 3 to the left of coil MMR, close, establishing a holding circuit for the master-miss relay. Contacts MMR4, located above counter 271 in FIGURE 4 open, preventing energization of pawl solenoid 251 at this time.

As the first master moves down the conveyor 18 to the printing head 11 of the machine (FIGURE 1) it first actuates master feed reset switch 144 (FIGURE 2), opening the switch from its original engagement with terminal 143 and closing the switch upon its alternate contact in series with switch 163. The initial opening of switch 144 from its terminal 143 opens the holding circuit for the master feed relay MFR and de-energizes that relay. When the master feed relay drops out, contacts MFR1 open so that the subsequent re-closing of switch 144 upon its terminal 143 does not again energize the master feed relay coil MFR. Moreover, contacts MFR2 open, de-energizing the audio signalling device buzzer 139. Contacts MFR3 open, de-energizing the master feed solenoids 261–263. This action occurs before a second master can be fed from the supply 17 in master feeder 16 to the printing head of the machine.

As noted above, master feed reset switch 144 closes upon its terminal 164 in series with the companion switch 163. This action takes place a short time interval before switch 163 is opened by the master moving from the master feeder to the printing head. Upon initial actuation of switch 144, the stepping switch solenoid SS located adjacent second switch stage 152 in FIGURE 3, is energized through a circuit that begins at bus 133 and extends through switches 144 and 163 and through diode 165 to the stepping switch solenoid. It should be noted that the stepping switch solenoid is provided with a return to the negative DC bus 122 through switch 166.

Stepping switch 151–153, in accordance with conventional practice, is advanced each time solenoid SS is energized and subsequently de-energized. That is, energization of the solenoid does not immediately move the stepping switch; this action occurs only upon subsequent de-energization of the solenoid SS. But switch 163 opens shortly after switch 144 closes; accordingly, solenoid SS is de-energized and the stepping switch advances one step when the circuit to solenoid SS is broken at switch 163. Thus, the circuit comprising master feed reset switches 144, 163 affords a means for initiating operation of the stepping switch upon feeding of a master to a first position relative to the printing head of the machine.

With reference to FIGURE 2, it is seen that the first terminal in the first stage 151 of the stepping switch, when engaged by the wiper arm of the stepping switch, completes an electrical connection from the positive-polarity "automatic" DC bus 155 to the first row in the plugboard comprising program unit 161. In this first row of the plugboard, there is only one connector, preferably a diode connector, linking that row of the plugboard to the column B conductor in the plugboard. There are no other connections from the first row of the plugboard to any of the other columns. The plugboard connector in the first row thus affords a connection providing a positive DC voltage on the line B that extends into cable 167.

The positive signal on line B is supplied to the blanket cleaner relay coil BCR (FIGURE 3). The resulting energization of the blanket cleaner relay opens contacts BCR1, located in the upper lefthand corner of FIGURE 2, and de-energizes the blower solenoid 124. Contacts BCR2, also in FIGURE 2, are closed, energizing blanket cleaner solenoid 123 and initiating operation of the blanket cleaner mechanism in the machine.

Energization of the blanket cleaner relay also closes contacts BCR3 in the lower central portion of FIGURE 4. Closing of these contacts is required to establish the initial operating circuit for pawl solenoid 251, a circuit that is subsequently used to actuate the pawl solenoid and advance the main control shaft 62 of the machine from its "zero" position. But this circuit is not yet complete because, as noted above, contacts MMR4 are open; the circuit can only be completed when the master-miss relay drops out.

As the first master reaches a position immediately adjacent the master cylinder, a position from which the master can be inserted mechanically in operative position on the cylinder, switches 183 and 184 (FIGURE 3) close. As a consequence, the master arrival relay coil MAR is energized, signalling that the master has arrived at its insertion position.

Upon energization of the master arrival relay, contacts MAR1 (FIGURE 3) open, de-energizing the operating coil MMR of the master-miss relay. As a consequence, contacts MMR1 open and contacts MMR2 close; these sets of contacts are located immediately to the left of the second stage 152 of the selector switch in FIGURE 3. Contacts MMR3 open, interrupting the holding circuit for the master-miss relay coil and preventing re-energization of the master-miss relay when the master arrival relay subsequently drop out. Contacts MMR4 (FIGURE 4) re-close. However, closing of contacts MMR4 does not yet establish a pulsing circuit for pawl solenoid 251 because the master arrival relay contacts MAR2 have opened in the "forward" pulsing circuit to the solenoid.

In FIGURE 5, contacts MAR3 open upon the energization of the master arrival relay coil, preventing energization of the slave relay coil SR and the cycle-out relay coil COR. Also, in FIGURE 5, contacts MAR4 open and contacts MAR5 close, preventing energization of cylinder stop relay coil CSR. The master arrival relay remains energized only as long as switches 183 and 184 are held closed by the master at the insertion position; there is no holding circuit for this relay.

Approximately one full cycle of operation of the printing head of the machine subsequent to the initial stepping of the stepping switch, the revolution count switch 181, seen in FIGURE 3 to the left of stepping switch 152, closes momentarily. A cam, not shown, operates switch 181 once for each revolution of the cylinder. Actually, switch 181 closes in each cycle of machine operation but prior closings of this switch have not been significant with respect to overall operation of the control system. Once the stepping switch 152 has moved by one step, however, the next closing of switch 181 will not energize the stepping switch solenoid SS, because the master miss relay MMR (FIGURE 3) is energized only as a result of energization of master feed relay MFR (FIGURE 2). Energization of MMR opens MMR2 (FIGURE 3) to de-energize line 168 and arrest operation of stepping switch 152 in position step 1 until the master arrival relay is actuated by a master arriving at the pickup position. When MAR is energized, its contact MAR1 de-energizes MMR and causes line 168 to again supply power pulses to stepping switch 152 through a circuit that begins at bus 155 and extends through switch 181, diode 178, contacts MMR2 (now closed), contacts HR3, conductor 168, and stepping switch stage 152 to the stepping switch solenoid. The revolution count switch 181 stays closed only momentarily; as soon as it opens, solenoid SS is de-energized and the stepping switch advances a second step. Thus, switch 181 and the connecting circuit to solenoid SS afford a means for advancing the stepping switch one step for each revolution of the printing head cylinders.

With the stepping switch advanced just two steps, column B is still the only column of the program unit 161 that is effectively connected to the positive DC supply through stepping switch stage 151. That is, conductor B is the only one of the column conductors in the plugboard that is maintained at a positive DC operating level. The blanket cleaner relay remains energized and blanket cleaner operations continue. The master arrival relay coil MAR remains energized as described above, because insertion of the master on the master cylinder of the machine has not yet been accomplished and switches 183 and 184 remain in closed condition. In the next cycle of machine operation, revolution count switch 181 again closes momentarily, and then open whereupon the stepping switch advances to its third step.

With the stepping switch at its third position away from the home position for the switch, two of the column conductors of program unit 161 are energized. Column B in the program unit remains energized, holding the blanket cleaner relay coil BCR in actuated condition and continuing the blanket cleaning operation. In addition, however, column M of the program unit is now connected to the positive DC supply, through the third row connection illustrated in FIGURE 2, establishing a positive DC voltage on the conductor M that extends into cable 167.

The positive potential on conductor M is effective to complete an energizing circuit for the first master insertion relay coil MIRA (FIGURE 3) upon closing of cycle control switch 192 upon its contact 191. The energizing circuit, beginning at conductor M of cable 167, extends through contacts RSR2, contacts MIRD2, cycle control switch 192, contacts MIRD3, diode 189, and contacts MIRC1 to the first master insertion relay coil MIRA. Energization of coil MIRA is effected during 135° of rotation of the master cylinder, this being the time at which the cycle control switch closes its movable contact upon terminal 191, see FIGURE 6.

Energization of master insertion relay coil MIRA closes contacts MIRA1 in the energizing circuit for the second master insertion relay coil MIRB. However, coil MIRB is not yet energized because there is no connection completed at terminal 193 of switch 192. Contacts MIRA2 open, preventing energization of the fourth master insertion relay coil MIRD. Contacts MIRA3 close, establishing a holding circuit for coil MIRA that bypasses cycle control switch 192. Contacts MIRA4 close, completing a holding circuit for the master insertion relays through conductor 230 and the "double master" switch 137 from the main DC bus 121 (FIGURES 2 and 3). Moreover, contacts MIRA5 close in the operating circuit for the master ejection solenoid 201; however, this solenoid is not yet energized because contacts MIRB4 are open.

Later in the same cycle of machine operation, the cycle control switch 192 closes upon its second fixed terminal 193, this action occurring during 135° of rotation beyond the point at which the switch was closed upon its terminal 193. When this occurs, because contacts MIRA1 are already closed, the second master insertion relay coil MIRB is energized through contacts MIRA1 and through the cycle control switch.

With coil MIRB energized and the second master insertion relay thus actuated, contacts MIRB1 close in the operating circuit for the fourth master insertion relay coil MIRD. However, coil MIRD is not energized because contacts MIRA2 are held open, the first master insertion relay still being energized as illustrated in the timing chart, FIGURE 6. Contacts MIRB2 also close, establishing a holding circuit for the second master insertion relay coil MIRB that is independent of the cycle control switch 192.

Contacts MIRB3 of the second master insertion relay also close. The closing of contacts MIRB3 sets up an operating circuit for the third master insertion relay coil MIRC. This circuit, however, is not yet complete because cycle control switch 192 is not presently closed upon its contact 191. Finally, contacts MIRB4 close. Since contacts MIRA5 are already closed, as noted above, the ejection solenoid 201 and operating lever solenoid 203 are both energized. The circuit for solenoid 201 begins at the AC bus 126 and extends through contacts MIRB4, MIRC3, and MIRA5, all of which are now closed. The circuit for solenoid 203 is the same except that it does not include the last set of contacts MIRA5. Later in the same revolution of the master cylinder, any master that may have been present on the cylinder is automatically ejected, as indicated in FIGURE 6.

When cycle switch 192 next closes upon its contact 191, in the next revolution of the master cylinder, the third master insertion relay coil MIRC is energized through the cycle control switch and through contacts MIRD3 and MIRB3. Upon energization of coil MIRC, contacts MIRC1 open and the first master insertion relay, comprising coil MIRA, drops out. Contacts MIRC2 are now closed. Consequently, the holding circuit for the master insertion relays that was previously maintained by contacts MIRA4 is held in through contacts MIRC2 so that the opening of contacts MIRA4 does not break the operating circuit.

In FIGURE 3, contacts MIRC3 open, de-energizing both of the solenoids 201 and 203. Contacts MIRC4, however, close. This energizes the master insertion solenoid 202, through contacts MIRC4 and contacts MIRB4, which have previously been closed. Energization of solenoid 202 is effective to carry forward the insertion of the master on to the cylinder as indicated in FIGURE 6.

When the first master insertion relay coil MIRA is de-energized, upon opening of contacts MIRC1 as noted above, contacts MIRA1 open. However, coil MIRB is not de-energized, being held in through its own contacts MIRB2. Contacts MIRA2 re-close, permitting energization of coil MIRD at a subsequent time in the same cycle of operation, as described below. Contacts MIRA3 open, breaking the holding circuit for coil MIRA. Contacts MIRA5 open in the operating circuit for solenoid 201.

The third master insertion relay coil MIRC does not have a separate holding circuit. Consequently, this relay drops out when, later in the same cycle of revolution of the master cylinder, switch 192 is opened with respect to its terminal 191 and closes with respect to its terminal 193.

When switch 192 does close upon its contact 193, the fourth master insertion relay coil MIRD is energized through the contacts MIRB1, which have previously been closed, and through contacts MIRA2, which have now re-closed. Actuation of the fourth master insertion relay closes contacts MIRD1 to establish a holding circuit for the relay independent of the initial energizing circuit. Contacts MIRD2 are opened, de-energizing the second master insertion relay coil MIRB. It should be noted that this coil is not instantaneously de-energized upon opening of contacts MIRD2, but is held in for a predetermined time interval by the resistance-capacitance circuit 196–197. Accordingly, the second master insertion relay does not drop out immediately but remains energized a short time interval after energization of coil MIRD. Contacts MIRD3 are now open, preventing subsequent re-energization of coils MIRA and MIRC through switch 192, so that the next master insertion cycle must again through the conductor M. Contacts MIRD4 close, energizing the operating lever solenoid 203 a second time to complete the master insertion and ejection operation. Moreover, contacts MIRD5 open, but this has no effect upon the operating circuit because switch 206 is in its automatic position.

Contacts MIRD1, although closed, cannot hold coil MIRD energized beyond the time when cycle control switch 192 opens with respect to its contact 193, because both the first and third master insertion relay coils MIRA and MIRC have now been de-energized and contacts MIRA4 and MIRC2 are open. Accordingly, the relay comprising coil MIRD drops out when switch 192 re-opens with respect to its terminal 193 and the master insertion relays are all restored to their original de-energized condition, remaining in that condition until the next master insertion cycle occurs.

When the master insertion operation is completed, and the master has been pulled from the conveyor 18 on to the master cylinder of the printing head 11 (FIGURE 1), master arrival switches 183 and 184 (FIGURE 3) again open. Consequently, coil MAR is de-energized and the master arrival relay drops out.

When the master arrival relay drops out, contacts MAR1 (FIGURE 3) re-close. However, the master-miss relay coil MMR is not energized at this time because the master feed switch 145 is not closed and the master feed relay contacts MFR1 are open (FIGURE 2). Contacts MAR2, FIGURE 4, re-close. Because the blanket cleaner relay is energized and contacts BCR3 are closed, pawl solenoid 251 is energized the next time that switch 252 closes upon its "forward" contact. The initial energization of the pawl solenoid advances the master control shaft 62 of the machine from its "zero" position to its "one" position. The complete energizing circuit for the pawl solenoid extends from the solenoid through switch 252, the contacts MAR2, contacts MMR4, contacts BCR3, switch 255, and switch 206 to AC bus 126. In the "one" position, repellent application is initiated; see Gammeter application Ser. No. 568,837 filed July 29, 1966, now Patent No. 3,420,169.

When the master arrival relay drops out, contacts MAR3 (FIGURE 5) also close, but, in a normal cycle of operation, this does not result in energization of the slave relay coil SR or the cycle-out relay coil COR because the cylinder stop relay coil CSR has not been energized and its contacts CSR1 are not closed. Contacts MAR4 re-close and contacts MAR5 open at the time the master arrival relay drops out, restoring the operating circuit for the cylinder stop relay to its original condition ready for subsequent operation.

On the next revolution of the printing head, the revolution count switch 181 again closes and, shortly thereafter, re-opens, energizing the stepping switch solenoid SS for a short time interval, as described above. As a consequence, the stepping switch is advanced to its fourth operating terminal. With reference to FIGURE 2, it is seen that the blanket cleaner column conductor B of program unit 161 is again held energized so that the blanket cleaner relay BCR is maintained in its actuated condition and the blanket cleaning operation proceeds as before. For this fourth position of the stepping switch, there is no connection to column M of the program unit and no energizing signal is supplied to conductor M in cable 167. However, there is a plug connection from the fourth row of the program unit to the C column thereof, the C column being the controlling portion of the program unit with respect to the blanket drying function for the printing system. Accordingly, a positive operating potential is applied to conductor C of cable 167 and the blanket dry relay coil BDR (FIGURE 4) is energized.

Upon actuation of the blanket dry relay, contacts BDR1 (FIGURE 4) close. If selector switch 247 is at its central position, as illustrated in FIGURE 4, the closing of contacts BDR1 makes no difference in the operation of the system and blanket drying is effected in conventional manner. On the other hand, in instances where short run printing jobs are being carried out by the system, it frequently is desirable to accelerate the blanket drying operation by feeding one or more sheets of paper through the system to absorb the cleaner fluid applied to the blanket by the blanket cleaner mechanism. The paper may be fed from either the primary feeder 12 or the auxiliary feeder 14, depending upon which paper supply is the least expensive and the most absorbent. If selector switch 247 is closed on its "primary" terminal, it is seen that the closing of contacts BDR1 energizes the primary feed solenoid 245 through a circuit that extends from the solenoid through selector switch 247 and contacts BDR1 and COR6 to switch 206 and thence to AC bus 126. For this position of the selector switch 247, therefore, a single sheet of paper is fed to the printing machine from the primary paper supply 12. If selector switch 247 is closed upon its "auxiliary" terminal, on the other hand, it is the auxiliary feed solenoid 232 that is energized through the same circuit and a blanket drying sheet is fed from the auxiliary paper supply 14.

Energization of the blanket dry relay coil BDR as described above, also operates to close contacts BDR2 in FIGURE 4. However, closing of these contacts at this time does not affect operation of the system because contacts BDR2 are in series with the normally open cycle-out relay contacts COR7.

With the main control shaft 62 in the "one" position, the control shaft switch 128 (FIGURE 2) closes upon its contact 131. With switch 128 in this position, the control relay coil CR is held in by a direct circuit to the DC bus 133, independent of the holding circuit that extends through the cycle-out relay contact COR1 and the diode 135. The shaft-actuated control switch 255 (FIGURE 4) does not change its position and remains closed upon its contact 254. The switch 257, which is related to switch 255 in that they both are operated by shaft 62, however, is now actuated to close upon its contact 259. This does not complete an operating circuit, however, because the cycle-out relay contacts COR7 and COR8 are both open. The remaining shaft-actuated switch 294 (FIGURE 5) remains closed upon its terminal 293.

In the next cycle of machine operation, the revolution count switch 181 again closes and opens shortly thereafter. As a consequence, the stepping switch solenoid SS is again energized for a brief period and then de-energized, advancing the stepping switch 151–153 to its fifth position.

With stepping switch stage 151 at its fifth position, it is seen that a connection from the positive DC bus 155 is again established through the stepping switch and through the program unit 161 to the blanket cleaner control column B and thus to conductor B of cable 167. Accordingly, the blanket cleaner relay coil BCR remains energized as before. Moreover, with the stepping switch in its fifth position, the blanket dry column C of the program unit remains connected to the positive DC supply so that the blanket dry relay coil BDR, through its connection to conductor C, remains energized. Because the blanket dry relay remains in its actuated condition, the primary paper feed solenoid 245 (FIGURE 4) remains energized through the contacts BDR1 and through selector switch 247, if the selector switch is in its "primary" position. Thus, a second sheet of paper may be fed to the printing head of the machine to assist in drying the blanket.

In the machine cycle during which the stepping switch remains in its fifth position, solenoid 251 again receives a pulse signal, through the pulse switch 252, by means of a circuit comprising contacts BCR3, which remain closed, and switch 255, as described above. This drives the main control shaft 62 of the printing head 11 to its "two" position to initiate master inking as described in Gammeter et al. Patent No. 3,056,346. Following re-positioning of the control shaft, switch 128 (FIGURE 2) which its operates remains closed upon its contact 131. Shaft operated switch 255 (FIGURE 4) now closes upon its contact 256 and becomes open-circuited with respect to its contact 254. Shaft operated switch 257 remains closed upon its contact 259. Shaft operated switch 294 (FIGURE 5) remains closed upon its contact 293. The most significant of these changes is the actuation of switch 255 (FIGURE 4), since the change in this switch now prevents further actuation of pawl solenoid 251 through the circuit comprising the blanket cleaner relay contacts BCR3.

In the next cycle of machine operation, revolution count switch 181 again closes momentarily, and then opens, briefly energizing the stepping switch solenoid SS and advancing the stepping switch to its sixth position. Referring to FIGURE 2, and specifically to program unit 161, it is seen that for the sixth position of stage 151 of the stepping switch, there is no electrical connection provided from the positive DC supply to any of the column conductors of the program unit. Since there no longer is a positive potential upon program unit conductor B, the blanket cleaner relay coil BCR (FIGURE 4) is de-energized and the blanket cleaner relay drops out. Similiarly, since there is no longer a positive DC voltage on conductor C, the blanket dry relay drops out because its coil BDR is no longer energized.

When the blanket cleaner relay drops out, its contacts BCR1 (FIGURE 2) re-close, completing an operating circuit for blower solenoid 124 between the "running" AC bus 126 and AC bus 118. Contacts BCR2 return to their open condition, de-energizing blanket cleaner solenoid 123 and interrupting the application of cleaning solution to the blanket. With the blower operating, and with no more cleaning solution supplied to the blanket, the blanket is dried. The two sheets of paper fed to the printing head, if used as described above, assist in the operation, "mopping up" some of the blanket cleaner fluid from the blanket cylinder.

De-energization of the blanket cleaner relay also opens its contacts BCR3 (FIGURE 4) but this has no immediate effect upon operation of the circuit because the switch 255 in series with contacts BCR3 is already open.

When the blanket dry relay drops out, as described above, its contacts BDR1 (FIGURE 4) open. This prevents the feeding of additional paper, on succeeding cycles of machine operation, until such time as the first paper feeder is energized for printing operations. It should be noted that with the program shown for program unit 161, just two sheets of paper are fed through the printing head of the system for the purpose of accelerating the drying of the blanket. Contacts BDR2, also shown in FIGURE 4, open when the blanket dry relay drops out to prevent the premature and undesired reverse actuation of the main control shaft of the machine.

In the next cycle of machine operation, revolution count switch 181 again closes momentarily and opens, stepping the stepping switch to its seventh position. The seventh terminal of the stepping switch section 151 is connected to the seventh row of program unit 161, which is provided with a diode plug connecting the row conductor to the column D conductor of the program unit. As a consequence, a positive DC voltage is applied to conductor D in cable 167, energizing the cylinder contact relay coil CCR (FIGURE 5).

Actuation of the cylinder contact relay closes its contacts CCR1, near the bottom of FIGURE 3 and energizes the operating lever solenoid 203. The mechanical structure under control employs a series of swinging arms to grasp the master as it is delivered by conveyor 18, and pass the master to a gripper system carried by the master cylinder. The arms pass close to the cylinder, then after releasing the master, swing on to a position out of the way. It is desirable not to return there arms until the master is fully installed upon the cylinder in order not to strike the body of the master as it is being pulled onto the cylinder. Therefore, energization of solenoid 203 at this period of the cycle will assure return only after the master is safely installed.

Contacts CCR2 (FIGURE 4) also close, energizing pawl solenoid 251 through a circuit beginning at bus 126 and extending through contacts CCR2, MMR2, MAR2, and pulse switch 252 to the solenoid. In this cycle of operation, the pawl solenoid actuates the main control shaft of the printing head to its "three" position. In addition, contacts CCR3 (FIGURE 5) close to afford a holding circuit for the cylinder contact relay coil CCR. This circuit, however, is maintained for only a short time interval because switch 294 opens from its contact 293 and closes upon its contact 295 as soon as the main control shaft reaches its "three" position. At the "three" position for the control shaft, blanket imaging is initiated, following the same basic position sequence as described in the aforementioned Patent No. 3,056,346.

With respect to the other switches controlled by the main control shaft 62 of the machine, control switch 128 remains closed upon its contact 131 and switch 255 remains engaged with its terminal 256. However, switch 157 (FIGURE 4) now opens with respect to its terminal 259 and closes upon its contact 258.

In the next three cycles of machine operation, there is no substantial change because contacts 8, 9, and 10 of stepping switch stage 151 (FIGURE 2) are all connected through program unit 161 to the cylinder contact conductor D that was energized in the preceeding cycle. During these three cycles of machine operation, the blanket image is built up by application of ink from the master. It will be recognized that the duration of the blanket imaging operation, in terms of machine cycles, can be varied directly in terms of machine cycles, rather than time, to suit the needs of a particular printing program, depending upon the number of contacts of the stepping switch that are connected to the cylinder contact conductor D in the program unit. Indeed, this is equally true with respect to most of the machine functions controlled through program unit 161.

When stepping switch 151–153 reaches its eleventh contact, however, using the illustrated program, program unit 161 no longer affords an electrical connection to the cylinder contact column conductor D. With the resulting loss of DC voltage on conductor D, the cylinder contact relay coil CCR (FIGURE 5) is de-energized and the relay drops out. Contacts CCR1 (FIGURE 3) open to de-energize solenoid 203. Contacts CCR2 open, preventing further energization of the pawl solenoid 251. Contacts CCR3 open, preventing energization of the coil CCR through the holding circuit.

With the stepping switch at its eleventh position, a DC voltage is applied to the column E program feeder. It should be recalled that the system is conditioned to utilize the primary paper supply 12 as the "first" but that this relationship can be changed to permit use of the auxiliary supply 14 as the "first" feeder if desired. The positive DC voltage on conductor E is applied to switches 314–317 in FIGURE 5, but these switches are all open and no further action ensues. But conductor E is also connected, at program unit 161, to conductor 229, so that a positive DC potential is applied to the primary feeder relay coil FRA (FIGURE 4) through counter contacts 226 and 227 and feeder stop switch 228.

Actuation of the primary feeder relay coil FRA closes contacts FRA1, located near the top left-hand corner of FIGURE 3. Upon closing of contacts FRA1, a positive DC voltage is supplied to conductor X through diode 176, to conductor 229 through diode 172, and to conductor 168 through diode 171 and homing relay contacts HR3. The continuous DC energization of line 168 maintains the stepping switch solenoid SS in energized condition. During subsequent machine cycles, therefore, the opening and closing of revolution count switch 181 is not effective to step the stepping switch. Thus, the feeder relay contacts FRA1, and connecting circuits, afford a means for inhibiting operating of the stepping switch advancing means during operation of the first sheet feeder.

The positive DC potential supplied to conductor 229 through contacts FRA1 affords a holding circuit for coil FRA that extends through contacts 226 and 227 of counter 221 (FIGURE 4). In this manner, the feeder relay coil is maintained continuously energized until counter 221 counts out and opens its contacts 226 and 227.

The positive DC voltage on line X energizes the cylinder stop relay coil CSR (FIGURE 5) through the delay device 318. As a consequence, contacts CSR1 close, energizing the slave relay coil SR, the master arrival contacts MAR3 being closed. Energization of coil SR closes its contacts SR1 to establish a holding circuit for the slave relay. Contacts CSR2 open, so that the cycle-out relay coil COR is not energized.

Actuation of the primary feeder relay coil FRA, as described above, also opens contacts FRA2 (FIGURE 4) to prevent operation of the motor driven counter 221 in its reverse direction. Contacts FRA3 close, affording an AC input to the forward winding of the counter motor, to enable it to count in a forward direction. Contacts FRA5 close in the input circuit to the counter, which is connected to the paper count switches 215 and 224. Moreover, contacts FRA4 close to complete an energizing circuit to the primary supply feed solenoid 245, initiating the feeding of paper for printing purposes from the primary supply. As indicated above, the selection of the primary feeder as the first feeder to supply paper for printing is determined by adjustment of switch 239.

In each machine cycle after the initiation of feeding of the paper from the first paper supply, in this instance the primary paper supply 12, revolution count switch 181 closes and opens, as before. However, because the stepping switch solenoid SS is maintained continuously energized, stepping switch remains at its eleventh position until such time as the desired preset number of sheets of paper have been fed to the printing head of the machine. As each sheet of paper passes to the printing head, switch 215 (FIGURE 4) closes, after which switch 224 opens, this sequence of sensing switch operations indicating the passage of each sheet of paper. The paper count switch operations produce individual pulses, one for each sheet of paper, that are supplied to the bi-directional motor driven counter 221 and are counted by the counter. Control circuit conditions remain the same and printing continues until the counter 221 counts out. The number of copies required to cause the counters to count out is determined solely by the setting of the counter as established by the machine operator.

When the counter 221 (FIGURE 4) counts out, both of the contacts 226 and 227 of the counter open. As a consequence, the feeder relay coil FRA is de-energized and this relay drops out.

When the feeder relay drops out, its contacts FRA1 (FIGURE 3) open, removing the positive DC potential from conductors X, 168, and 229. The loss of the positive DC supply on conductor 168 de-energizes the stepping switch solenoid SS and the stepping switch advances to its twelfth position. The loss of the DC supply on conductor 229 prevents re-energization of feeder relay coil FRA. The loss of the positive potential on conductor X would de-energize the cylinder stop relay coil CSR, but this is prevented by the delay characteristics of device 318, which holds coil CSR energized long enough to start the second paper feed operation.

Dropout of the feeder relay coil FRA also closes its contacts FRA2 (FIGURE 4) and energizes the reverse drive for counter 221, actuating the counter back to its original or "zero" position. Contacts FRA3 open, preventing forward actuation of the counter until such time as the feeder relay is again energized. Contacts FRA5 open, so that the counter 221 no longer receives paper count pulses from switches 215 and 224. Contacts FRA4 open, de-energizing the primary feeder solenoid 245 and halting the feeding of paper from the primary feeder 12.

Once the stepping switch is advanced to step twelve, there is no longer a circuit connection to the E column conductor in program unit 161. However, a new circuit connection is established to the F column conductor. Consequently the second feeder relay coil FRB, near the bottom of FIGURE 4 is energized from conductor F in a circuit that extends through contacts 276 and 277 of the second or auxiliary counter 271.

On energization of the second feeder relay coil FRB, contacts FRB1 (FIGURE 4) close to energize solenoids 231 and 232 and initiate the feeding of paper from the auxiliary feeder 14. Contacts FRB2 close, completing a holding circuit for the coil FRB from the DC bus 133 through diode 281 to the counter contacts 276 and 277. The closing of contacts FRB2 also applies a positive DC potential to conductor V through diode 283 and to conductor X through diode 291. Contacts FRB3 close, energizing the forward drive circuit for the bi-directional motor driven counter 271. Contacts FRB4 open, preventing energization of the reverse drive circuit for counter 271. Also, contacts FRB5 close, to connect the pulse input circuit for counter 271 to the paper count switches 224 and 215. For succeeding cycles of operation, counter 271 counts the sheets of paper or other print-receiving sheets that are fed to the machine from auxiliary feeder 14.

Line V is connected as shown at the top of FIGURE 3, to the stepping switch solenoid SS, maintaining the stepping switch solenoid continuously energized and preventing stepping of the stepping switch until such time as the desired number of print-receiving sheets are supplied to the machine from auxiliary feeder 14. The positive DC supply connection to line X re-establishes the energizing circuit for cylinder stop relay coil CSR (FIGURE 5).

In succeeding machine cycles, the feeding of paper continues from auxiliary feeder 14 until counter 271 counts the preset number of sheets to be printed from the auxiliary supply. When counter 271 counts out, its contacts 276 and 277 both open, de-energizing feeder relay coil FRB so that the auxiliary feeder relay drops out. Contacts FRB1 open, de-energizing solenoids 231 and 232 and interrupting the feeding of paper to the printing head of the machine. Contacts FRB2 open, opening the holding circuit for coil FRB, de-energizing line V and de-energizing line X. Contacts FRB3 open, breaking the AC circuit to the forward drive for the motor driven counter 271. Contacts FRB4 close, energizing the reverse circuit for the counter motor. Contacts FRB5 open, disconnecting the counter from the paper count switches 224 and 215.

The loss of the positive DC supply on line V occasioned by the opening of contacts FRB2 (FIGURE 4) is effective to de-energize the stepping switch solenoid SS. Consequently, the stepping switch advances to its thirteenth step. The loss of the positive DC potential on line X is effective to break the energizing circuit for cylinder stop relay coil CSR (FIGURE 5), but coil CSR is held energized due to the delay characteristics of device 318. When the stepping switch 151 reaches its thirteenth step, it connects the positive DC line to column conductor K. Conductor K is connected to the homing relay coil HR (FIGURE 5) and, accordingly, the homing relay is energized.

Upon actuation of the homing relay, its contacts HR1 (FIGURE 3) close, connecting the DC bus 155 through diode 186, conductor 190 and contacts COR2 to the master feed relay MFR in FIGURE 2. Accordingly, the master feed relay is energized to initiate a second master feed cycle. As a part of the master feed operation, the master-miss relay coil MMR (FIGURE 3) is energized through the circuit connection provided by contacts HR1 and diodes 186 and 185. Furthermore, the closing of contacts HR1 applies a positive DC potential to the run-down switch 211 (top FIGURE 4). This produces no operating effect in the machine, assuming the switch 211 is in its illustrated central position.

Actuation of the homing relay also closes contacts HR2 located near the top of FIGURE 3, and connects the positive DC bus 133 to line 168 to energize the stepping switch solenoid SS. This energizing circuit, however, includes the normally closed contacts SS2 of the stepping switch. Accordingly, as soon as the stepping switch solenoid ie energized, contacts SS2 open, de-energizing the solenoid and causing the stepping switch to advance one step. The advance to step fourteen of the stepping switch does not effectively change the circuit connections, since the homing relay coil HR is held energized through its contacts HR5 (FIGURE 5). Hence, solenoid SS is again energized and immediately de-energized by opening of contacts SS2. This process continues, the homing means comprising the homing relay and contacts SS2 stepping the stepping switch rapidly to its "home" position, ready for the next printing operation.

Actuation of the homing relay also opens contacts HR3 (FIGURE 3) to prevent the application of a positive DC voltage to line V at this time. Contacts HR4 (FIGURE 4) close so that the pawl solenoid 251 is pulsed through the "reverse" terminal of pawl pulse switch 252, driving the main control shaft 62 of the machine back from its "three" position to its "two" position. As noted, contacts HR5 (FIGURE 5) close to establish and maintain a holding circuit for coil HR until the stepping switch reaches its zero or home position and switch 294 opens, the opening of switch 294 occurring upon movement of the main control shaft back to its "two" position as described above. With respect to the other switches actuated by the main control shaft, it will be seen that switch 255 (FIGURE 4) remains engaged with its contacts 256, switch 257 returns to its contact 259, and switch 128 remains engaged with its terminal 131. As soon as switch 294 opens, the homing relay coil HR is de-energized and a new printing cycle is initiated by the feeding of a master, the sequence of operations being essentially as described above except that the main control shaft never retreats to its "one" position but remains in either the "two" position or the "three" position throughout the continuing operation.

The master feed cycle initiated by actuation of the master feed relay coil MFR, as described above, causes the second master to close switches 183, 184 (FIGURE 3) and energize the master arrival relay coil MAR before the cylinder stop relay CSR drops out. Consequently, contacts MAR3 (FIGURE 5) open, de-energizing the slave relay coil SR and preventing initiation of a cycle-out operation, the cycle-out function being described hereinafter.

SECONDARY OPERATIONS OF ELECTRICAL CONTROL CIRCUIT

Dual feeding of masters

In operation of the automated printing machine 10 (FIGURE 1), it may happen that the master feeder 16 will feed two masters simultaneously down the conveyor 18 to the printing head 11 of the machine. If this occurs, it is necessary to interrupt machine operations, since two masters mounted on the master cylinder of the machine at the same time may not produce satisfactory images, due to the excess thickness, and since one of the masters will not be reproduced at all.

The thickness of each master, as it is fed down the conveyor, is checked by the "double master" sensing switch 137 (top left of FIGURE 2). Switch 137 detects the excessive thickness of the plurality of masters on the conveyor and opens from its normally closed terminal, closing upon its alternate terminal 138. As a consequence, the audible warning signal, buzzer 139, is energized and runs continuously to warn the operator that a failure of operation has occurred. Furthermore, the opening of switch 137 from its normally closed contact, breaks the energizing circuit for the control relay coil CR and the control relay drops out.

As soon as the control relay drops out, its contacts CR5 close. Consequently, the warning lamp 141 is now energized, through the circuit including terminal 138 of double master switch 137. With both lamp 141 and audible signal device 139 energized, the operator is informed that the source of difficulty is the presence of a plurality of masters in the conveyor leading to the printing head.

When the control relay drops out, its contacts CR1 open, de-energizing the drive motor relay coil DMR. As a consequence, contacts DMR1 and DMR2 open, stopping the drive motor DM and the pump motor PM.

De-energization of the control relay coil CR also opens contacts CR3, effectively de-energizing bus 133. Contacts CR2, on the other hand, re-close. The closing of contacts CR2 establishes an energizing circuit for the stepping switch solenoid SS (FIGURE 3) only after the double master situation is corrected and switch 137 restored, then a circuit is established through conductor 168, for all positions of the stepping switch other than the home position, through stage 152 of the stepping switch. As soon as solenoid SS is energized, however, the normally closed stepping switch contacts SS1 (FIGURE 2) that are in the energizing circuit open. Consequently, the stepping switch is stepped forward one step. De-energization of the stepping switch solenoid SS permits its contacts SS1 to re-close, again completing the energizing circuit for the stepping switch solenoid. As soon as the solenoid is energized, contacts SS1 again open and the stepping switch moves forward another step. In this manner, the stepping switch is stepped repetitively until its reaches its home position, at which time the energizing circuit for solenoid SS can no longer be completed through stage 152 of the stepping switch.

Dropout of the control relay also results in the opening of contacts CR4 (FIGURE 2) so that the "running" AC bus 126 is now de-energized. It is thus seen that the system shuts down completely; moreover, it cannot be restarted until the operator removes the two masters from the conveyor, permitting the double master sensing switch 137 to return to its normal position as shown in the drawings. As soon as this is done, the buzzer 139 and the warning lamp 141 are de-energized. The operator is then able to start the machine up against as described above.

Machine stopped by operator

When the operator desires to terminate the machine operation completely, it is only necessary to open stop switch 127 (FIGURE 2). The opening of switch 127 interrupts the energizing circuit for the control relay coil CR. It will be seen that the net effect of this direct de-energization of the control relay is the same as described above for the "double master" condition except that the buzzer 139 and the warning lamp 141 are not energized. In all other respects, machine shutdown occurs as described before, and it is necessary for the operator to restart the machine completely. There is another procedure that may be followed for temporary shutdown of the printing system, described hereinafter in relation to the cycle-out relay coil COR (FIGURE 5).

Low supply in master stack

When the supply of masters in the master supply 17 (FIGURE 1) reaches a predetermined minimum level, this condition is sensed by switch 142 (FIGURE 2), which closes. In the next master feed cycle, upon energization of master feed relay coil MFR, as described above, the closing of contacts MFR2 establishes an energizing circuit for buzzer 139, through the master feed reset switch 144. The buzzer remains actuated only until switch 144 is opened from its contacts 143 by the passage of the master down the conveyor. It will be recalled that the master feed relay coil MFR is also de-energized when switch 144 opens, so that the buzzer is not placed in continuous operation.

The brief operation of the audio warning signal, buzzer 139, informs the operator that the supply of masters is low and should be replenished unless it is desired to let the machine shut down when no more masters are available.

Rundown of blanket cylinder

In many instances, it may be desirable to run additional copies from the blanket cylinder after ink transfer from the master cylinder to the blanket cylinder has been interrupted. This is usually done to facilitate blanket cleaning operations prior to the next printing run. The rundown copies are generally legible and readable, although they may be lighter in tone than the copies made during the regular printing run. In those instances where there is a substantial difference between the copy sheets being fed to the machine from the two different paper feeders 12 and 14, it is desirable to be able to control the source of the copy sheets used for rundown purposes, particularly if the rundown copies are to be discarded. Complete and fully flexible control in this regard is afforded by the rundown switches 211 and 234 (FIGURE 4), which are ganged together for joint operation.

For example, it may be assumed that a rundown operation is to be performed and that the copy sheets for the rundown procedure are to be obtained from the primary feeder 12. To this end, switches 211 and 234 are actuated to engage their "primary" terminals (FIGURE 4).

When the complete printing operation is finished, as described above, and the homing relay coil HR is actuated, with contacts HR1 (FIGURE 3) closing, the rundown relay coil RDR (FIGURE 4) is energized through a circuit beginning in FIGURE 3 at bus 155 and extending through contacts HR1 and diode 212 to switch 211, FIGURE 4, and thence to the rundown relay coil. When this occurs, contacts RDR2 close, establishing a holding circuit for coil RDR through paper count switch 215. Contacts RDR1 (FIGURE 4) also close, energizing the primary feed solenoid 245 through switch 234 to feed a rundown sheet from the primary supply to the printing head of the machine.

The rundown sheet, as it is fed to the printing head, is of course effective to actuate paper count switch 215. The opening of switch 215 breaks the holding circuit for the rundown relay coil RDR and this relay drops out, the homing relay HR having previously dropped out as described above. With the homing conductor K energized, one rundown sheet of paper is fed, under the control of the rundown relay comprising coil RDR.

If the rundown sheets are to be taken from the auxiliary feeder 14, the procedure is as described above except that swicthes 211 and 234 (FIGURE 4) are set to their auxiliary terminals. As a consequence, it is the auxiliary feed solenoid 231 and 232 which are energized and the rundown sheet is fed from the auxiliary supply instead of the primary supply.

Feeder stop under operator control

To interrupt paper feed under control of the operator, switch 228 (FIGURE 4) in the energizing circuit for the feeder relay coil FRA is opened. This is done during the paper feed operation. As a consequence, the feeder relay drops out. The resulting opening of contacts FRA4 is effective to de-energize the primary feeder solenoid 245, interrupting the feeding of sheets from the primary feeder 12. The foregoing operation occurs if switch 239 is in its illustrated position and the primary feeder 12 is the first feeder to feed copy sheets to the machine. If switch 239 is in its alternate position and the auxiliary feeder 14 is the first feeder, then the opening of contacts FRA4 interrupts feed from the auxiliary feeder because it de-energizes solenoids 231 and 232.

Dropping out of the feeder relay also opens its contacts FRA1, FIGURE 3. This moves the positive DC voltage from conductors 168, 299, and X. The loss of positive voltage on line 168 causes the stepping switch to advance to its next position, which would be position twelve because the first feeding operation is accomplished with the stepping switch at its position eleven. The loss of the positive DC voltage on conductor 229 prevents re-energization of the feeder relay coil FRA. The de-energization of conductor X permits delayed de-energization of the cylinder stop relay coil CSR (FIGURE 5), but this is not effective if the second feeder picks up as in the normal operating cycle described above. The remainder of operations in the printing cycle proceed as above; closing of the feed stop switch 228 has the same effect as if counter 221 had counted out completely. If desired, a similar feeder stop switch can be incorporated in the energizing circuit for the second feeder relay coil FRB to simulate a count-out of counter 271.

Cycle-out operation

The cycle-out operation, initiated by energization of the cycle-out relay coil COR (FIGURE 5) may be initiated in several different ways. Thus, this particular operation may be started upon closing of any of the switches 314, 315 and 316, which indicate sub-minimum supplies of sheets in the stacks 13 and 15 or of no masters in the supply 17. The cycle-out operation can also be initiated deliberately by the operator by closing switch 317. Moreover, under certain circumstances, the cycle-out operation may be initiated by the cylinder stop relay as described more fully hereinafter.

Upon closing of any of the switches 314–317, the cycle-out relay coil COR is not immediately energized. In fast, operation of the machine is not affected or changed in any manner until the stepping switch 151–153 reaches its eleventh step and supplies a positive DC potential on conductor E. With one of the cycle-out switches closed, the positive potential on line E not only energizes the first feeder relay coil FRA and starts the first paper feeder in operation, but also energizes coil COR through a circuit beginning with conductor E and extending through the switch that has been closed and through diode 313 to coil COR. Upon energization of coil COR, contacts COR9 close, establishing a holding circuit for the cycle-out relay.

Actuation of the cycle-out relay opens its contact COR1 (FIGURE 2) but this has no immediate effect because the operating circuit for coil CR is held closed through the parallel circuit extending through switch 128. Contacts COR2 open to prevent energization of the master feed relay coil MFR through circuit 190. This prevents initiation of a master feed cycle.

Contacts COR3, in FIGURE 3, close to afford an energizing circuit for solenoid SS, a circuit that is completed at a subsequent time when the master-miss relay is energized as described hereinafter. In this same figure, contacts COR4 open to prevent energization of the latch solenoid 202. This prevents the insertion of a new master onto the master cylinder of the printing machine. Contacts COR5 also open to prevent energization of the blanket cleaner relay coil BCR and thereby prevent initiation of a blanket cleaning operation.

In FIGURE 4, contacts COR6 open. This prevents energization of the paper feed solenoids 231, 232 and 245 through the circuit comprising contacts BDR1 and selector switch 247. This precludes the initiation of a blanket dry operation using paper for mop-up drying. However, it does not inhibit energization of the paper feed solenoids through their normal operating circuits comprising the feeder relays FRA and FRB. Contacts COR7 and COR8 close to afford enabling circuits for reverse actuation of the pawl solenoid 251. Neither of these circuits is complete at this time, however, because switch 257 is closed upon its contact 258.

The first paper feed and printing operation proceeds as described above; when completed, stepping switch 151–153 moves on to its twelfth position, initiating paper feeding from the second feeder. The second paper feed and printing operation also proceeds uninterrupted and, when complete, causes the stepping switch to advance to its thirteenth position as described above. When the stepping switch reaches the thirteenth position, conductor K is connected to the positive DC supply through the program unit 161 and the homing relay coil HR (FIGURE 5) is energized.

Actuation of the homing relay, with the cycle-out relay coil COR energized, initiates some but not all of the normal homing functions. Thus, contacts HR1 (FIGURE 3) close to energize the master-miss relay coil MMR. The closing of these contacts is also effective to energize the rundown relay coil RDR, through switch 211. The consequent closing of contacts RDR1 and RDR2 provides for a rundown cycle as described above. But the closing of contacts HR1 does not, in this instance, provide for energization of the master feed relay coil MFR because contacts COR2 are open, as noted above. Accordingly, initiation of the master feed operation is prevented.

Energization of the homing relay also closes contacts HR2 to advance the stepping switch to its home position in accordance with the homing operation described before. Contacts HR3 again open to prevent the application of a positive DV voltage to conductor V. Moreover, contacts HR4 close, supplying a "reverse" pulse signal to pawl 251 through the circuit comprising pulse switch 252 and control switch 257. Accordingly, the pawl solenoid actuates the main shaft control mechanism, driving the main shaft 62 back to its "two" position.

With the main control shaft in its "two" position, in the next cycle of operation another reverse pulse is supplied to pawl 251 through a circuit comprising pulse switch 252, control switch 257, contacts COR8 (now closed) and control switch 255. Thus, the pawl solenoid is again actuated and drives the master control shaft of the printing machine back to its "one" position. It will be understood that this circuit cannot subsequently actuate the pawl mechanism to the "zero" position because switch 255 is actuated from engagement with its contact 256 to close upon its contact 254 as soon as the control shaft 62 reaches the "one" position.

The continued stepping of the stepping switch, through operation of its contacts SS2 (FIGURE 3) proceeds as in a normal cycle until the stepping switch reaches its home position. Since switch 294 (FIGURE 5) is now open-circuited with respect to its contact 295, the holding circuit for coil HR is broken as soon as the stepping switch reaches the home position and the homing relay drops out.

In the next cycle of machine operation, however, upon closing of revolution count switch 181, the stepping switch solenoid SS is again energized through the circuit comprising switch 181, diode 178, contacts MMR1 (now closed) and contacts COR3 (FIGURE 3). When switch 181 opens, the stepping switch advances one step. As before, this movement of the stepping switch applies a positive DC potential to line B in program unit 161 (FIGURE 2). But energization of conductor B cannot initiate a blanket cleaning operation because the blanket cleaner relay coil BCR (FIGURE 3) is open-circuited at the contacts COR5. In the next cycle of machine operation, the stepping switch advances to its second terminal but there is no change in the operating circuit. In the next machine cycle, the stepping switch reaches its third terminal and energizes program unit conductor M (FIGURE 2) as well as conductor B. The resultant application of a positive DC potential to conductor M actuates the master insertion relays MIRA–MIRD in the manner described above and is effective to eject the used master from the master cylinder of the machine. However, a master insertion operation is not carried out; it will be recalled that the contacts COR4 (FIGURE 3) are open and that solenoid 202 cannot be energized. Moreover, there should be no new master available for insertion because the master feed operation has not been initiated, the master feed relay coil MFR (FIGURE 2) being open-circuited at the contacts COR2.

In the next machine cycle, the stepping switch advances to its fourth terminal and conductor C in program unit 161 is connected to the positive DC supply. This is effective to energize the blanket dry relay BDR (FIGURE 4). As a consequence, contacts BDR2 close to complete an energizing circuit for the pawl solenoid 251. This circuit extends from solenoid 251 through pulse switch 252 and control switch 257 to contacts BDR2 and then through contacts COR7 and switch 206 to the AC bus 126. The pulsing of solenoid 251 through this circuit causes the pawl mechanism to drive the master control shaft 62 back to its "zero" position, opening switch 128 (FIGURE 2). This action by control switch 128 opens the operating circuit for the control relay coil CR and causes the machine to shut down as described above.

As noted above, the cycle-out operation may on occasion be initiated by operation of the cylinder stop relay comprising the coil CSR. Coil CSR is energized in each printing operation of the machine during those intervals in which the feeder relays FRA and FRB are energized. At the end of the printing run using sheets from the second feeder, the actuating signal on line X (FIGURE 5) is interrupted but coil CSR remains energized through delay device 318 for a substantial time interval determined by the circuit parameters for the delay device and particularly by resistor 319 and capacitor 320. In ordinary operation, the delay afforded by device 318 is long enough so that the new master being fed to the printing head of the machine reaches the "arrival" or insertion position in conveyor 18 in time to close switches 183 and 184 (FIGURE 3) and actuate the master arrival coil MAR before the cylinder stop relay drops out. In this normal sequence of operations, the resultant opening of contacts MAR3 (FIGURE 5) prevents actuation of the cycle-out relay coil COR when the contacts CSR2 in circuit with coil COR re-close.

In the event of a malfunction on the part of the master feeder, however, or if a master hangs up in conveyor 18, the master arrival sensing switches are not actuated and the master arrival remains unactuated at the time that cylinder stop relay coil CSR is deenergized. When this occurs, and contacts CSR2 close, it will be seen that coil COR is energized through a circuit comprising diode 312, contacts CSR2, contacts SR1, and contacts MAR3. Note that the slave relay coil SR has previously been energized and remains energized through its own contacts SR1. Upon energization of coil COR, the cycle-out operation proceeds as described above just as if it had been initiated by closing of one of the switches 314–317.

Re-start with master on cylinder

In some instances, it may prove necessary for the operator to shut the machine down at a time when a master is mounted on the master cylinder of the printing head. Moreover, machine shutdown may occur automatically, under some circumstances, with this operating condition prevailing. The re-start circuit, comprising switch 298 and the re-start relay, is provided to enable the operator to continue with operations and to print from the master already mounted in the printing head of the machine. To accomplish this, the operator closes switch 298.

The closing of switch 298 energizes the re-start relay coil RSR, through diode 299. Energization of the re-start relay closes its contacts RSR1 and establishes a holding circuit for the relay through switch 294, which would be in the "zero" position, the machine having been shut down. Moreover, closing of the re-start switch applies a positive DC potential to conductors W and Z in cable 167, through diodes 301 and 302 respectively.

The positive DC potential applied to line W actuates the stepping switch solenoid SS (FIGURE 3) directly, since conductor W is connected to the stepping switch solenoid through diode 165. Unlike the operating circuit employed to actuate solenoid at the beginning of a wholly new printing operation, actuation through conductor W does not provide for energization of the master feed relay coil MFR (FIGURE 2). Consequently, no master feed cycle is initiated.

To go forward with a printing operation, however, it is necessary to simulate the arrival of a master at the insertion position in conveyor 18 in order to actuate the master arrival relay coil MAR. This is accomplished by the DC potential on conductor Z, which is directly connected to coil MAR (FIGURE 3) and does not require the closing of the master arrival switches 183 and 184. It should also be noted that the contacts RSR2 in FIGURE 3 are opened upon energization of the re-start relay, preventing the initiation of a master ejection and insertion operation by precluding energization of the relay coils MIRA–MIRD in FIGURE 3. Thus, the re-start circuit cycles the machine in the normal manner except that it prevents a master feed operation and also inhibits ejection of the master already on the cylinder.

Manual operation

To enable the machine operator to control the printing machine on a manual basis, switch 154, FIGURE 2, is thrown to the manual position. This disconnects the "automatic" DC bus 155 and connects the "manual" DC bus 156 to the "running" DC bus 133. By disconnecting bus 155, it is seen that no DC operating voltage is supplied to the stepping switch stages 151–153.

The machine operator also actuates switch 166 (FIGURE 3) to its manual position. This is effective to open the return circuit for the stepping switch solenoid SS. It also disconnects conductor 311 from the negative DC bus 122 so that there is no return circuit for the cycle-out relay coil COR (FIGURE 5). The operator also closes switch 206 (FIGURE 3) upon its manual terminal 207 to energize the master insertion operating lever solenoid 203 to permit insertion of a master on the master cylinder of the printing machine. Furthermore, the operator closes switch 210 to afford a positive DC supply to the blanket cleaner switch 209. All of the switches 154, 166, 206 and 210 may be ganged together for simultaneous actuation by the machine operator.

For manual control, the machine is placed in operation in the same manner as when automatic control is employed, the operator closing switch 132 (FIGURE 2). This energizes the control relay coil CR to complete the operating circuits to the running DC bus 133 (and "manual" bus 156) by closing contacts CR3 and to complete the circuit to the running AC bus 126 by closing contacts CR4. As before, contacts CR1 close to energize the drive motor relay coil DMR. Actuation of the drive motor relay again completes the operating circuits to the drive motor and the pump motor by closing contacts DMR1 and DMR2.

With the machine in operation, the operator first closes the master feed switch 145 (FIGURE 2). This energizes both the master feed relay coil MFR and the master-miss relay coil MMR.

Energization of the master feed relay coil MFR closes its contacts MFR1 to establish a holding circuit for this relay and for the master-miss relay. The closing of contacts MFR2 has no effect unless the stack of masters in master feeder 16 is at the minimum warning level, in which case buzzer 139 is actuated. The closing of contacts MFR3 (FIGURE 4) energizes the master feed solenoids 261–263 and causes the master feeder to feed a master down conveyor 18, applying a wetting solution to the master. The master can then be manually inserted upon the master cylinder by the machine operator.

Energization of the master-miss relay closes its contacts MMR1 in series with revolution count switch 181 but this produces no operating effect because bus 155 is not energized. For the same reason, the opening of contacts MMR2 and the closing of contacts MMR3 is of no significance. Similarly, the opening of contacts MMR4 (FIGURE 4) has no effect on machine operation.

When the master is fed down conveyor 18, it opens switch 144 with respect to its terminal 143, breaking the holding circuit for the master feed relay coil MFR and the master-miss relay coil MMR. Thus, the master feed and master-miss relays drop out as soon as feeding of the master is completed.

When the operator has mounted the master on the master cylinder of the printing machine, inking of the master and the application of repellent to the master are initiated manually under control of the operator. This is accomplished by means of handle 43 (FIGURE 1) which the operator actuates to bring shaft 62 first to its "one" position to begin inking and then to its "two" position to initiate repellent application.

Cleaning of the blanket is started by the operator by closing switch 209 (FIGURE 3) to energize the blanket cleaner relay coil BCR. Contacts BCR1 open (FIGURE 2) to de-energize blower solenoid 124. Contacts BCR2 close to actuate blanket cleaner solenoid 123. The duration of the blanket cleaning operation is determined by the time interval during which the operator keeps switch 209 closed. When the switch is subsequently returned to its open condition, the blanket cleaner relay drops out, de-energizing solenoid 123 and again energizing solenoid 124. The operator may then permit the machine to run for a period of time to allow for drying of the blanket by the blower.

Imaging of the blanket is initiated by the operator moving the main control shaft 62 (FIGURE 1) to its "three" position, using handle 43. After several cycles to build up the ink image on the blanket, printing is started by the closing of switch 173 (FIGURE 3). The closing of this switch energizes the first feeder relay coil FRA (FIGURE 4) through a circuit beginning at the manual bus 156 in FIGURE 3 and extending through switch 173 and conductor 229 and through motor counter contacts 226, 227 and switch 228 to the feeder relay. The closing of the feeder relay contacts FRA1, FIGURE 3, establishes a holding circuit for the feeder relay. The closing of contacts FRA4 (FIGURE 4) energizes either the primary feeder solenoid 245 or the auxiliary feeder solenoids 231, 232, depending upon the position of selector switch 239. Thus, the operator can still select either the primary feeder or the auxiliary feeder as the source of print-receiving sheets even on manual operation.

When the desired number of sheets have been printed, the printing operation is interrupted by actuation of feeder stop switch 228 which de-energizes the feeder relay coil FRA. It should be noted that counter 221 does not count the sheets because the counter input, comprising paper count switch 215, can develop no signal due to the fact that bus 155 is de-energized. To shut the machine down, the operator restores it to the original operating condition through actuation of the manual control handle 43, final shutdown being accomplished by actuation of stop switch 127 (FIGURE 2) to de-energize the control relay coil CR.

SUMMARY

From the foregoing description, it will be apparent that the control system of the present invention affords complete automation for a cyclically operable offset printing machine that enables the operator merely to start the machine and then allow the machine to control itself. The only continuing action required by the operator is to maintain the sheet feeders 12 and 14 and the master feeder 16 supplied with paper and with masters. The operator has full control of the order in which sheets are fed to the machine for printing from primary feeder 12 and auxiliary feeder 14. The operator also has completely independent control of the source of sheets used for blanket drying and for rundown purposes, being able to select either sheet feeder as a source of these sheets. Of course, the operator can also eliminate the use of sheets from either feeder for either or both purposes.

The cycle-out control of the present invention enables the operator to interrupt the printing machine at a predetermined point in its operational program following the completion of a printing run by actuating the cycle-out switch 317 at any point during the run. Moreover, the cycle-out circuits of the control system afford the same operation upon depletion of the master supply 17 or whenever either of the paper stacks 13 and 15 reaches a predetermined minimum level. The cycle-out portion of the control system also affords this type of shut down whenever there is a failure to feed a new master to the machine. A more rapid shutdown is provided upon feeding of more than one master, since an effective printing cycle could not be completed in this circumstance.

Maximum flexibility is afforded, in the control system of the invention, by a separation of control functions between program unit 161, main control shaft 62, and counters 221 and 271. In particular, because the sheet counting function is separate from the main program unit, maximum flexibility is obtained with a program unit of minimum size and complexity. This is particularly important where two machines are connected in tandem and controlled from the single program unit 161, the second unit control being afforded by the additional columns A, J, and L of program unit 161. The system provides for restarting of the machine with a master already on the master cylinder by means of the restart switch 298.

The control system of the invention provides for very high speed operation and is assisted in this regard by the complete elimination of necessity for actuation at any stage on the part of the operator. As an example of the speeds attainable, the machine can be operated at a printing rate of forty-eight sheets per minute, printing eight sheets each from six different masters. Comparable rates of operation are virtually impossible to achieve with prior art arrangements.

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention as hereinafter claimed.

What is claimed is:

1. A control system for a cyclically operable offset printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print receiving sheets, blanket cleaner means, blanket dryer means, and a sheet feeder for feeding print-receiving sheets to said blanket cylinder, said control system comprising:
    a stepping switch having a home terminal and a multiplicity of output terminals;
    a program unit for establishing a sequential program for said machine, said program unit having a multiplicity of input terminals corresponding to the output terminals of said stepping switch, a plurality of output terminals, and means for individually selectively interconnecting any of said program unit output terminals, individual ones of said program unit output terminals being electrically connected to actuating circuits for said master ejection and insertion means, said blanket cleaner means, said blanket dryer means, and said sheet feeder;
    a presettable counter for counting print-receiving sheets fed to said blanket cylinder;
    advancing means for actuating said stepping switch one step for each revolution of said cylinder;
    means for initiating operation of said stepping switch advancing means by a master placed in a first position relative to said master cylinder;
    means for inhibiting operation of said stepping switch advancing means upon actuation of said sheet feeder; and
    homing means for returning said stepping switch to its home terminal whenever said counter counts out to a preset count,
    said homing means being electrically connected to said master feeder to initiate operation of said master feeder for installation of a replacement master during the time said stepping switch returns to its home terminal.

2. A control system for a cyclically operable printing machine, according to claim 1, and further comprising:
    cycle-out control means, actuatable at any point during the sequential program established by said program unit prior to actuation of said homing means, for establishing said sequential program of machine operation with all production functions blocked allowing only desirable non-production operations to proceed to a machine rest condition;
    said cycle-out control means including means for inhibiting operation of said master feeder following actuation of said cycle-out control means.

3. A control system for a cyclically operable printing machine, according to claim 2, and further comprising: a sheet supply sensing means, a master supply sensing means, and a master arrival sensing means, all coupled to said cycle-out control means to actuate said cycle-out control means in response to predetermined operating conditions of said machine; and manually operable means for actuating said cycle-out control means independently of any of said sensing means.

4. A control system for a cyclically operable offset printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print receiving sheets, blanket cleaner means, blanket dryer means, and a sheet feeder for feeding print-receiving sheets to said blanket cylinder, said control system comprising:
  a stepping switch having a home terminal and a multiplicity of output terminals;
  a program unit for establishing a sequential program for said machine, said program unit having a multiplicity of input terminals corresponding to the output terminals of said stepping switch, a plurality of output terminals, and means for individually selectively interconnecting any of said program unit input terminals to any of said program unit output terminals, individual ones of said program unit output terminals being electrically connected to actuating circuits for said master ejection and insertion means, said blanket cleaner means, said blanket dryer means, and said sheet feeder;
  a presettable counter for counting print-receiving sheets fed to said blanket cylinder;
  advancing means for actuating said stepping switch one step for each revolution of said cylinder;
  means for initiating operation of said stepping switch advancing means by a master placed in a first position relative to said master cylinder;
  means for inhibiting operation of said stepping switch advancing means upon actuation of said sheet feeder;
  homing means for returning said stepping switch to its home terminal whenever said counted counts out to a preset count;
  cycle-out control means, actuatable at any point during the sequential program established by said program unit prior to actuation of said homing means, for establishing said sequential program of machine operation with all production functions relating to the next printing sequence blocked, allowing only desirable non-production operations relating to the current printing sequence to proceed until a machine rest condition is attained; and
  a sheet supply sensing means, a master supply sensing means, and a master arrival sensing means, all coupled to said cycle-out control means to actuate said cycle-out control means in response to predetermined operating conditions of the machine.

5. A control system for a cyclically operable printing machine, according to claim 4, and further comprising:
  manually operable means for actuating said cycle-out control means independently of any of said sensing means.

6. A control system for a cyclically operable printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print receiving sheets, blanket cleaner means, blanket dryer means, and a primary sheet feeder and a secondary sheet feeder, each for feeding print-receiving sheets to said blanket cylinder, said automatic control system comprising:
  a stepping switch having a home terminal and a multiplicity of output terminals;
  a program unit for establishing a sequential program for said machine, said program unit having a multiplicity of input terminals corresponding to the output terminals of said stepping switch, a plurality of output terminals, and means for individually selectively interconnecting any of said program unit input terminals to any of said program unit output terminals, individual ones of said program unit output terminals being electrically connected to actuating circuits for said master ejection and insertion means, said blanket cleaner means, said blanket dryer means, and said sheet feeders;
  selector switch means for selecting either one of said sheet feeders as a first feeder and the other as a second feeder;
  first and second independently presettable counters for counting print-receiving sheets fed to said blanket cylinder from said first and second sheet feeders, respectively;
  advancing means for actuating said stepping switch one step for each revolution of said cylinders;
  means for initiating operation of said stepping switch advancing means by a master placed in first position relative to said master cylinder;
  means for inhibiting operation of said stepping switch advancing means during operation of said sheet feeders; and
  homing means for returning said stepping switch to its home terminal whenever said second counter counts out to a preset count.

7. A control system for a cyclically operable printing machine, according to claim 6, wherein said counters are operable sequentially independently of the sheet feeder selected as the first feeder.

8. A control system for a cyclically operable printing machine, according to claim 6, and further comprising auxiliary blanket dry means for actuating one of said sheet feeders to feed a selected number of sheets to said blanket cylinder, for blanket drying, without actuating either of said counters.

9. A control system for a cyclically operable printing machine, according to claim 6, including a blanket dry selector switch for selecting either of said primary and auxiliary sheet feeders, regardless of which is the first and which the second feeder, as the source of sheets used for blanket drying.

10. A control system for a cyclically operable printing machine, according to claim 6, and further comprising rundown control means, electrically connected to said homing means and to said sheet feeders, for actuating one of said sheet feeders to feed a preselected number of extra sheets to said blanket cylinder for rundown after said second counter has counted out, said rundown control means including a rundown selector switch for selecting either of said sheet feeders, regardless of which is the first and which the second feeder, as the source of rundown sheets.

11. A control system as defined in claim 10 further characterized in that said rundown control means is a non-counting switch operable to feed only one sheet after the count-out, whereby the final sheet printed is usable and consumes ink from said blanket cylinder which would otherwise load the blanket cleaner.

12. A control system for a cylically operable offset printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print receiving sheets, blanket cleaner means, blanket dryer means, and a sheet feeder for feeding print-receiving sheets to said blanket cylinder, said control system comprising:

a stepping switch having a home terminal and a multiplicity of output terminals;

a program unit for establishing a sequential program for said machine, said program unit having a multiplicity of input terminals corresponding to the output terminals of said stepping switch, a plurality of output terminals, and means for individually selectively interconnecting any of said program unit input terminals to any of said program unit output terminals, individual ones of said program unit output terminals being electrically connected to actuating circuits for said master ejection and insertion means, said blanket cleaner means, said blanket dryer means, and said sheet feeder;

a presettable counter for counting print-receiving sheets fed to said blanket cylinder;

advancing means for actuating said stepping switch one step for each revolution of said cylinder;

means for initiating operation of said stepping switch advancing means by a master placed in a first position relative to said master cylinder;

means for inhibiting operation of said stepping switch advancing means upon actuation of said sheet feeder;

homing means for returning said stepping switch to its home terminal whenever said counter counts out to a preset count;

dual master sensing means for sensing the simultaneous feeding of more than one master by said master feeder; and means for interrupting operation of said machine in response to actuation of said dual master sensing means, and setting up an audio-visual combination signal indicative only to a double master feed.

13. A control system for a cyclically operable offset printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print receiving sheets, blanket cleaner means, blanket dryer means, and a sheet feeder for feeding print-receiving sheets to said blanket cylinder, said control system comprising:

a stepping switch having a home terminal and a multiplicity of output terminals;

a program unit for establishing a sequential program for said machine, said program unit having a multiplicity of input terminals corresponding to the output terminals of said stepping switch, a plurality of output terminals, and means for individually selectively interconnecting any of said program unit input terminals to any of said program unit output terminals, individual ones of said program unit output terminals being electrically connected to actuating circuits for said master ejection and insertion means, said blanket cleaner means, said blanket dryer means, and said sheet feeder;

a presettable counter for counting print-receiving sheets fed to said blanket cylinder;

advancing means for actuating said stepping switch one step for each revolution of said cylinder;

means for initiating operation of said stepping switch advancing means by a master placed in a first position relative to said master cylinder;

a means for inhibiting operation of said stepping switch advancing means upon actuation of said sheet feeder;

homing means for returning said stepping switch to its home terminal whenever said counter counts out to a preset count;

restart means for restarting said machine with a master already on said master cylinder;

said restart means including means for inhibiting operation of said master feeder and said master ejection and insertion means without otherwise changing the sequential program established by said program unit.

14. In a control system for establishing and maintaining a repeating sequential program of operations in a cyclically operable offset printing machine of the kind comprising a rotatable master cylinder upon which a lithographic master may be removably mounted, a master feeder for feeding individual masters toward said master cylinder, master ejection and insertion means for ejecting a used master from said master cylinder and mounting a new master thereon, inking means and repellent applicator means for applying ink and an ink repellent to said master, a rotatable blanket cylinder synchronized with said master cylinder for receiving an ink image from a master on said master cylinder and for transferring that ink image to print-receiving sheets, blanket cleaner means, blanket dryer means, a primary and a secondary sheet feeder, each for feeding print-receiving sheets to said blanket cylinder, selector switch means for selecting either one of said sheet feeders as a first feeder and the other as a second feeder, first and second independently presettable counters for counting print-receiving sheets fed to said blanket cylinder from said first and second sheet feeders, respectively, and homing means for re-initiating said sequential program of operations whenever said second counter counts out to a preset count.

15. In a control system for a cyclically operable offset printing machine, according to claim 14, and further comprising auxiliary blanket dry means for actuating one of said sheet feeders to feed a selected number of sheets to said blanket cylinder, for blanket drying, without actuating either of said counters, a blanket dry selector switch for selecting either of said sheet feeders, regardless of which is the first and which the second feeder, as the source of blanket drying sheets.

16. In a control system for a cyclically operable offset printing machine, according to claim 14, and further comprising rundown control means for actuating one of said sheet feeders to feed a preselected number of sheets to said blanket cylinder for rundown after said second counter has counted out, a rundown selector switch for selecting either of said sheet feeders, regardless of which is the first and which the second feeder, as the source of rundown sheets.

17. In a control system for a cyclically operable offset printing machine, according to claim 14, cycle-out control means, actuatable at any point during said sequential program, for interrupting machine operation at a predetermined point in said program following a complete count-out of said second counter.

18. In a control system for a cyclically operable offset printing machine, according to claim 17, a primary sheet supply sensing means, a secondary sheet supply sensing means, a master supply sensing means, and a master arrival sensing means, all coupled to said cycle-out control means to actuate said cycle-out control means in response to predetermined operating conditions in said machine.

19. In a control system for a cyclically operable offset printing machine, according to claim 18, manually operable actuating means for actuating said cycle-out control means independently of any of said sensing means, said cycle-out control means including means for inhibiting operation of said master feeder following actuation of said cycle-out control means.

20. A control system for a cyclically operable duplicating machine of the kind comprising a rotatable master image cylinder, a master document feeder for feeding individual master documents into an operative position relative to said master image cylinder, a plurality of individual preparation means each effective to perform an individual operation in relieving said cylinder of one master image and in conditioning said cylinder for a subsequent duplication run with another master image from a new master document, and a sheet feeder for feeding print-receiving sheets into printing position to receive a duplicate image representative of the master image on said cylinder, said control system comprising:

- a stepping switch having a home terminal and a multiplicity of output terminals;
- a program unit for establishing a sequential program for said machine, said program unit having a multiplicity of input terminals corresponding to the output terminals of said stepping switch, a plurality of output terminals, and means for individually selectively interconnecting any of said program unit input terminals to any of said program unit output terminals, individual ones of said program unit output terminals being electrically connected to actuating circuits for each of said individual preparation means and for said sheet feeder;
- a presettable counter means for counting print-receiving sheets fed to said printing position;
- advancing means for actuating said stepping switch as a function of the revolutions of said cylinder;
- means for initiating operation of said stepping switch advancing means by a master document placed in a first position relative to said cylinder;
- means for inhibiting operation of said stepping switch advancing means upon actuation of said sheet feeder;
- homing means for returning said stepping switch to its home terminal as a function of said counter counting out to a present count;
- said homing means being electrically connected to said master feeder to initiate operation of said master feeder for installation of a replacement master document during the time said stepping switch returns to its home terminal.

References Cited

UNITED STATES PATENTS

| | | | |
|---|---|---|---|
| 2,759,416 | 8/1956 | George et al. | 101—144 XR |
| 2,916,988 | 12/1959 | Cragg | 101—144 |
| 2,990,768 | 7/1961 | Fischetti | 101—142 XR |
| 3,056,346 | 10/1962 | Gammeter et al. | 101—144 |
| 3,102,470 | 9/1963 | Cragg et al. | 101—144 |
| 3,158,418 | 11/1964 | Rush | 339—17 |

ROBERT E. PULFREY, Primary Examiner

C. D. CROWDER, Assistant Examiner

U.S. Cl. X.R.

101—232, 425